(12) United States Patent
Jiang

(10) Patent No.: US 12,150,182 B2
(45) Date of Patent: Nov. 19, 2024

(54) METHOD AND APPARATUS FOR RECEIVING TARGET DOWNLINK SIGNAL, AND DEVICE AND SYSTEM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 447 days.

(21) Appl. No.: 17/425,858

(22) PCT Filed: Jan. 31, 2019

(86) PCT No.: PCT/CN2019/074280
§ 371 (c)(1),
(2) Date: Jul. 26, 2021

(87) PCT Pub. No.: WO2020/155062
PCT Pub. Date: Aug. 6, 2020

(65) Prior Publication Data
US 2022/0183075 A1   Jun. 9, 2022

(51) Int. Cl.
*H04W 74/0833* (2024.01)
*H04L 1/1812* (2023.01)
(Continued)

(52) U.S. Cl.
CPC ....... *H04W 74/0841* (2013.01); *H04L 1/1812* (2013.01); *H04W 72/1273* (2013.01); *H04W 74/002* (2013.01)

(58) Field of Classification Search
CPC ......... H04W 74/0841; H04W 72/1273; H04W 74/008; H04L 1/1812
See application file for complete search history.

(56) References Cited

U.S. PATENT DOCUMENTS

| 11,695,515 B2 * | 7/2023 | Chai | H04W 76/28 370/329 |
| 2014/0099955 A1 * | 4/2014 | Nukala | H04W 36/36 455/436 |

(Continued)

FOREIGN PATENT DOCUMENTS

| CN | 108024320 A | 5/2018 |
| EP | 3371918 A | 9/2018 |

OTHER PUBLICATIONS

European Patent Application No. 19914125.0, Search and Opinion dated Aug. 8, 2022, 11 pages.
(Continued)

*Primary Examiner* — Christopher M Crutchfield
*Assistant Examiner* — Tito Q Pham
(74) *Attorney, Agent, or Firm* — Cozen O'Connor

(57) ABSTRACT

The present disclosure relates to a method and apparatus for receiving a target downlink signal, and a terminal and a system, wherein same belong to the field of communications and are applied to uplink and downlink transmission of an unlicensed frequency band. The method comprises: a terminal waiting to receive a target downlink signal in a first window; and when the terminal receives, in the first window, an indication sent by an access network device and indicating that a channel has been acquired, starting a second window. Waiting to receive the target downlink signal in the second window can solve the problem of additional power consumption caused by the terminal performing unnecessary monitoring for a long period of time when a base station cannot occupy an unlicensed band.

15 Claims, 14 Drawing Sheets

(51) Int. Cl.
    *H04W 72/1273*    (2023.01)
    *H04W 74/00*      (2009.01)

(56) References Cited

U.S. PATENT DOCUMENTS

| | | | |
|---|---|---|---|
| 2016/0088681 A1* | 3/2016 | Chang | H04W 28/0278 |
| | | | 455/405 |
| 2018/0077688 A1* | 3/2018 | Yi | H04W 16/14 |
| 2018/0103504 A1* | 4/2018 | Quan | H04W 52/02 |
| 2018/0183485 A1* | 6/2018 | Bontu | H04B 1/44 |
| 2018/0317264 A1* | 11/2018 | Agiwal | H04W 52/36 |
| 2020/0177318 A1* | 6/2020 | Belleschi | H04W 72/53 |
| 2021/0144723 A1* | 5/2021 | Takahashi | H04L 5/0053 |
| 2021/0176789 A1* | 6/2021 | Takahashi | H04B 7/088 |

OTHER PUBLICATIONS

ASUSTEK "Discussion on the expiry of DRX Retransmission Timer" 3GPP TSG-RAN2 Meeting #64, R2-086595, Nov. 2008, 5 pages.

PCT/CN2019/074280 English translation of the International Search Report dated Oct. 12, 2019, 2 pages.

Indian Patent Application No. 202147038098, Office Action dated Mar. 30, 2022, 6 pages.

\* cited by examiner

FFIG. 10 ion No. PCT/CN2019/074280, filed on Jan. 31, 2019, the entire contents of which are incorporated herein by reference.

METHOD AND APPARATUS FOR RECEIVING TARGET DOWNLINK SIGNAL, AND DEVICE AND SYSTEM

This application is the US national phase application of International Application No. PCT/CN2019/074280, filed on Jan. 31, 2019, the entire contents of which are incorporated herein by reference.

TECHNICAL FIELD

The disclosure relates to the field of communication, and more particularly, to a method, an apparatus, a device and a system for receiving a target downlink signal.

BACKGROUND

A hybrid automatic repeat request (HARQ) is a collection of automatic repeat request (ARQ) and forward error correction (FEC) technologies.

For downlink transmission, a user equipment (UE) starts a discontinuous reception hybrid automatic repeat request round-trip time (DRX HARQ RTT) timer after receiving downlink data sent by an access network device but failing to decode the downlink data successfully, and starts a downlink DRX retransmission timer after the DRX HARQ RTT timer timeouts. During the operation of the downlink DRX retransmission timer, the UE waits for receiving a physical downlink control channel (PDCCH) to receive a retransmission schedule of the access network device with respect to the downlink data. Similarly, for uplink transmission, the UE starts the DRX HARQ RTT timer after transmitting uplink data to the access network device, and starts an uplink DRX retransmission timer after the DRX HARQ RTT timer timeouts. During the operation of the uplink DRX retransmission timer, the UE waits for receiving the PDCCH to receive the retransmission schedule of the access network device with respect to the uplink data.

SUMMARY

According to a first aspect of embodiments of the disclosure, there is provided a method for receiving a target downlink signal. The method includes: waiting by a terminal for receiving a target downlink signal within a first window; launching a second window when the terminal receives an indication of having obtained channel sent by an access network device within the first window; and waiting for receiving the target downlink signal within the second window.

According to a second aspect of embodiments of the disclosure, there is provided a method for receiving a target downlink signal. The method includes: waiting for receiving a HARQ feedback information by a terminal within a third window corresponding to a DRX retransmission timer; and launching a short DRX cycle timer by the terminal to enter a short DRX cycle when the HARQ feedback information and an indication of having obtained channel are not received within the third window.

According to a third aspect of embodiments of the disclosure, there is provided a terminal. The terminal includes: a processor, a transceiver, and a memory. The transceiver is coupled to the processor. The memory is configured to store instructions executable by the processor. The processor is configured to load and execute the instructions to implement the method for receiving a target downlink signal according to the first aspect of embodiments of the disclosure.

According to a fourth aspect of embodiments of the disclosure, there is provided a communication system. The communication system includes: a terminal and an access network device. The terminal is the apparatus for receiving a target downlink signal according to the third or fourth aspect of embodiments of the disclosure.

According to a fifth aspect of embodiments of the disclosure, there is provided a computer readable storage medium. The computer readable storage medium has at least one instruction, at least one program, a code set or an instruction set stored thereon. The at least one instruction, the at least one program, the code set or the instruction set is configured to be loaded and executed by a processor to implement the method for receiving a target downlink signal according to the first aspect or the second aspect of embodiments of the disclosure.

DETAILED DESCRIPTION

Figure 1:
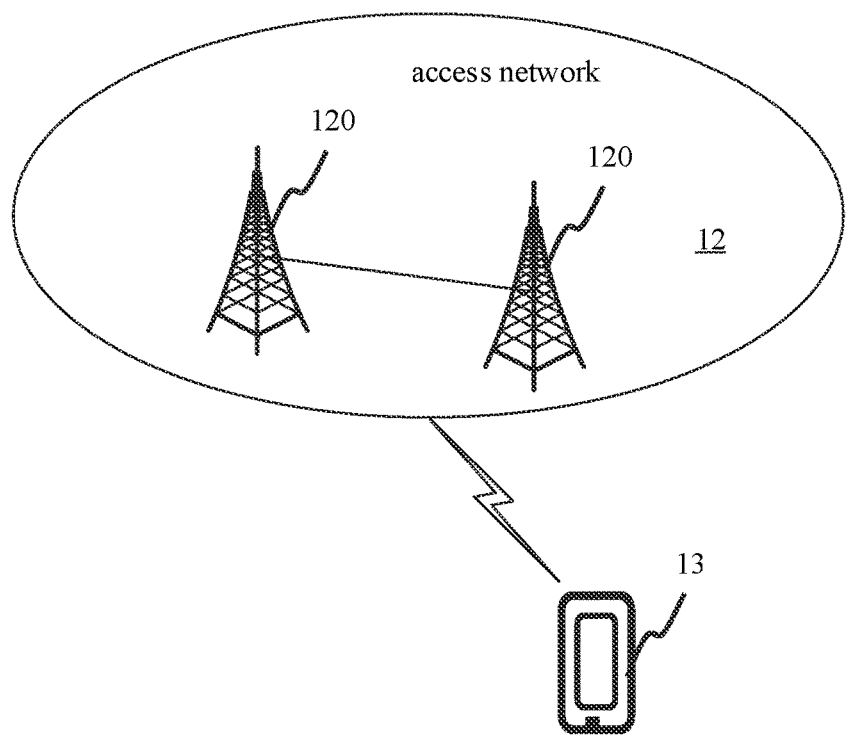
FIG. 1 is a schematic diagram illustrating an environment where a method for receiving a downlink signal is implemented according to an exemplary embodiment of the disclosure.

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the disclosure. Instead, they are merely examples of apparatuses and methods consistent with some aspects of the disclosure as described in the appended claims.

A network architecture and a service scenario described in embodiments of the disclosure are for the purpose of more clearly explaining the technical solutions of embodiments of the disclosure, and do not constitute a limitation for the technical solutions provided by embodiments of the disclosure. The skilled in the art knows that, with the evolution of the network architecture and the emergence of new service scenarios, the technical solutions provided by embodiments of the disclosure are equally applicable to similar technical problems.

As an unlicensed band is introduced into a new radio (NR) system, an access network device may not be able to obtain (or occupy) the unlicensed band to send PDCCH scheduling information during an operation of an uplink/downlink DRX retransmission timer when uplink/downlink transmission is performed in the unlicensed band. In the related art, a value of the downlink DRX retransmission timer is set to a larger value. However, the access network device may not send the PDCCH scheduling information to a terminal again. For example, the access network device correctly receives data, and has no new data to schedule, then the access network device may not send the PDCCH scheduling information to the terminal again. Therefore, setting the larger value for the DRX retransmission timer may make the terminal spend extra time waiting for receiving the PDCCH scheduling information, thereby increasing the power consumption of the terminal.

According to the disclosure, when the terminal receives an indication that a channel is obtained from a base station during an operation of a first window before obtaining a desired target downlink signal, the terminal launches a second window and waits for receiving the desired target downlink signal within the second window. When the target downlink signal is not received within the second window, the terminal stops waiting for receiving the target downlink signal. Since the terminal does not need to launch the second window when the access network device does not obtain an unlicensed band, extra power consumption caused by unnecessary monitoring of the terminal for a long period is avoided when the base station cannot occupy the unlicensed band. Compared with simply increasing the value of the DRX retransmission timer to the larger value, the method provided by the disclosure may save the power consumption of the terminal to a certain extent.

Embodiments of the disclosure may be applied to a communication system that uses the unlicensed band, such as a new radio unlicensed (NR-U) system. As illustrated in FIG. 1, the communication system may include an access network 12 and a terminal 13.

The access network 12 includes several access network devices 120. The access network device 120 may communicate with a core network device 110 each other through a certain interface technology, such as an S1 interface in a LTE system and an NG interface in a 5G NR system. The access network device 120 may be a base station. The base station is a device deployed in an access network and configured to provide a wireless communication function for the terminal. The base station may include various forms of stations, such as a macro base station, a micro base station, a relay station, and an access point. In systems with different wireless access technologies, names of devices with base station functions may be different. For example, in the LTE system, the device is called eNodeB or eNB. In the 5G NR system, the device is called gNodeB or gNB. With the evolution of communication technologies, the name "base station" may change. For the convenience of embodiments of the disclosure, the above devices for providing wireless communication functions for the terminal are collectively referred to as the access network device.

The terminal 13 may include various handheld devices, vehicle-mounted devices, wearable devices and computing devices having wireless communication functions or other processing devices connected to a wireless modem, as well as various forms of user equipment (UE), mobile stations (MS), terminals, and so on. For convenience of description, the above devices are collectively referred to as the terminal. The access network device 120 may communicate with the terminal 13 each other through some air interface technologies, such as a Uu interface.

Discontinuous reception (DRX) may enable the UE to periodically enter a dormant period at some time without monitoring the PDCCH scheduling information (or a PDCCH subframe). When the UE needs to monitor the PDCCH scheduling information, the UE is waked up from the dormant period, such that the UE may achieve the purpose of saving electricity.

A basic mechanism of the DRX is configuring a DRX cycle for the UE in an RRC_CONNECTED state. The DRX cycle consists of an "on duration" and a "DRX off". During the "on duration", the UE monitors and receives the PDCCH scheduling information. During the "DRX off", the UE does not receive data of the downlink channel to save power consumption. It may be seen from FIG. 2 that, in a time domain, time is divided into successive DRX cycles. When the UE receives a scheduling message during the "on duration", the UE may start a "drx-InactivityTimer" and monitor the PDCCH scheduling information in each subframe during the "on duration". When the DRX-inactivity-Timer is operating, even if an originally configured "on duration" ends, the UE still needs to continue monitoring the downlink PDCCH subframes until the DRX InactivityTimer timeouts.

Figure 2:
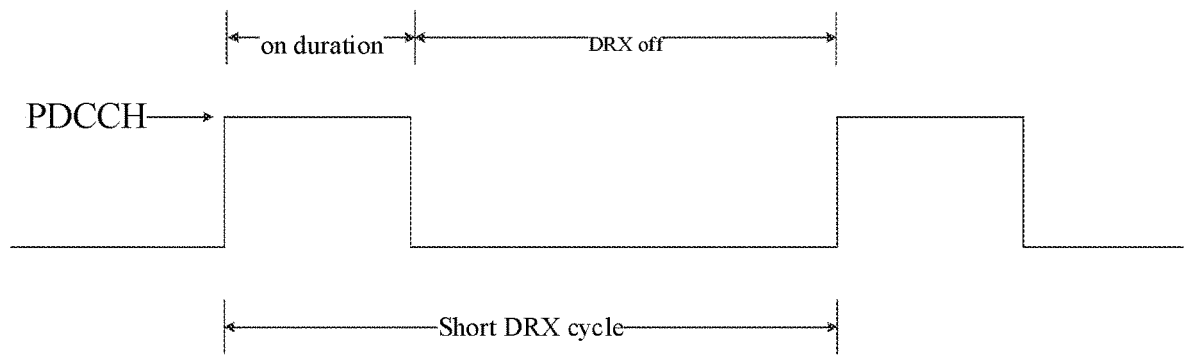
FIG. 2 is a schematic diagram illustrating a short DRX cycle in a downlink signal according to an exemplary embodiment of the disclosure.
Figure 3:
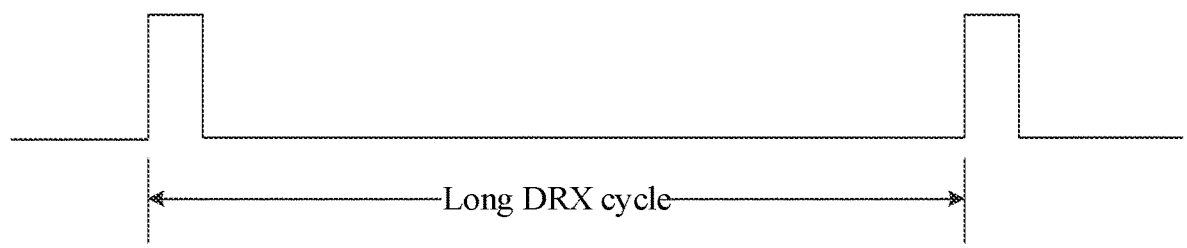
FIG. 3 is a schematic diagram illustrating a long DRX cycle in a downlink signal according to an exemplary embodiment of the disclosure.

The DRX cycle is equal to a sum of a wake-up period and a sleep period of the UE. The wake-up period is a duration of the on duration in one cycle, and the sleep period is a duration of the DRX off in one cycle. In the communication system, the system may configure a short DRX cycle as illustrated in FIG. 2, or a long DRX cycle as illustrated in FIG. 3 for the UE based on different service scenarios. The duration of the DRX off of the long DRX cycle is longer than that of the short DRX cycle. In other words, a ratio of the duration of the DRX off of the long DRX cycle is greater than that of the short DRX cycle.

Figure 4:
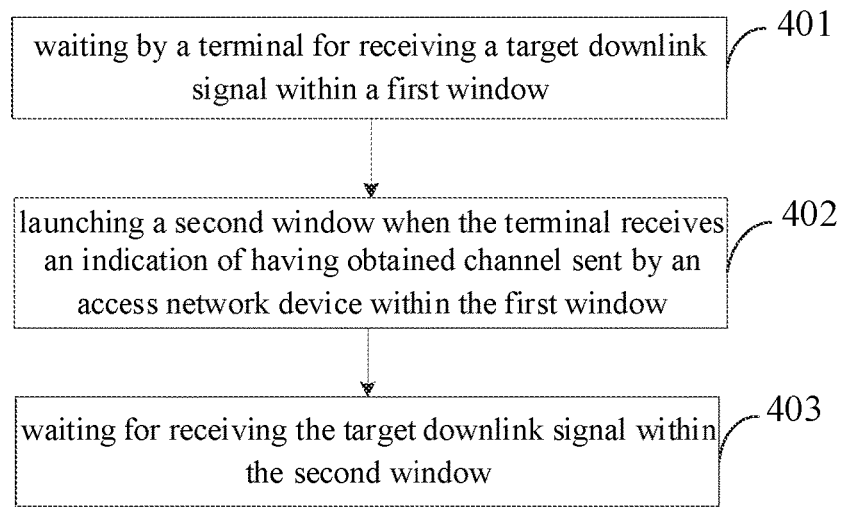
FIG. 4 is a flow chart illustrating a method for receiving a downlink signal according to an exemplary embodiment of the disclosure.

FIG. 4 is a flow chart illustrating a method for receiving a downlink signal according to an exemplary embodiment of the disclosure. The method may be executed by the terminal in the communication system illustrated in FIG. 1. The method may include following steps.

At step 401, the terminal waits for receiving a target downlink signal within a first window.

Uplink transmission and/or downlink transmission are performed between the terminal and the base station in an unlicensed band. As the unlicensed band is shared by multiple wireless communication technologies, the base station needs to determine that the unlicensed band is in an idle state by using Listen before Talk (LBT) when sending the target downlink signal to the terminal. When the unlicensed band is in the idle state, the unlicensed band is occupied to send the target downlink signal to the terminal.

The first window refers to a time window located in the time domain. Alternatively, the first window corresponds to a timer. The timer includes a start time point and a duration. In embodiments of the disclosure, the first window may be regarded as a corresponding time period during operation of the timer. In some simplified expressions, the timer is directly employed as an equivalent description of the first window.

Alternatively, the duration of the first window is pre-configured by the access network device or pre-determined by a communication protocol.

In different embodiments, the target downlink signal includes at least one of PDCCH scheduling information, retransmission scheduling information or new retransmission scheduling information of an HARQ process, and a random access response (RAR).

Since it is unpredictable when the base station may occupy the unlicensed band, the terminal waits for receiving the target downlink signal within the first window. In other words, the terminal monitors the target downlink signal within the first window, or the terminal monitors to receive the target downlink signal within the first window.

At step 402, the terminal launches a second window when receiving an indication of having obtained channel sent by the access network device within the first window.

The base station may send the target downlink signal and/or signals other than the target downlink signal on the unlicensed band when successfully occupying the unlicensed band. When the base station does not send the target downlink signal, but sends other signals on the unlicensed band, and the other signals can be recognized by the terminal, the terminal knows that the base station successfully occupies the unlicensed band.

The indication of having obtained channel is a signal which may indicate that the base station successfully occupies the unlicensed band within the first window. Alternatively, the indication of having obtained channel may be signaling or data sent by the base station to the current terminal, or may be signaling or data sent by the base station to other terminals, as long as the indication of having obtained channel may indicate that the base station occupies the unlicensed band and is in use.

Alternatively, the indication of having obtained channel includes at least one of a DRS, a CSI-RS, an SSB and a PDCCH indication.

When the terminal receives the indication of having obtained channel at a time point A within the first window and does not receive the target downlink signal before the time point A, the terminal launches the second window at the time point A.

The second window refers to another time window located in the time domain. Alternatively, the second window corresponds to a timer. The timer includes a start time point and a duration. A type of the second window may be the same as or different from that of the first window. The duration of the second window is preconfigured by the access network device, or is predefined by the communication protocol. "Launching the second window" means starting the timer corresponding to the second window in the terminal.

When the terminal launches the second window, the first window generally does not end. The terminal may close the first window, or may not close the first window such that the first window and the second window operate in parallel.

At step 403, the terminal waits for receiving the target downlink signal within the second window.

Alternatively, the duration of the second window is the same as that of the first window, or the duration of the second window is lower than that of the first window, or the duration of the second window and the duration of the first window conform to a preset ratio.

Figure 5:
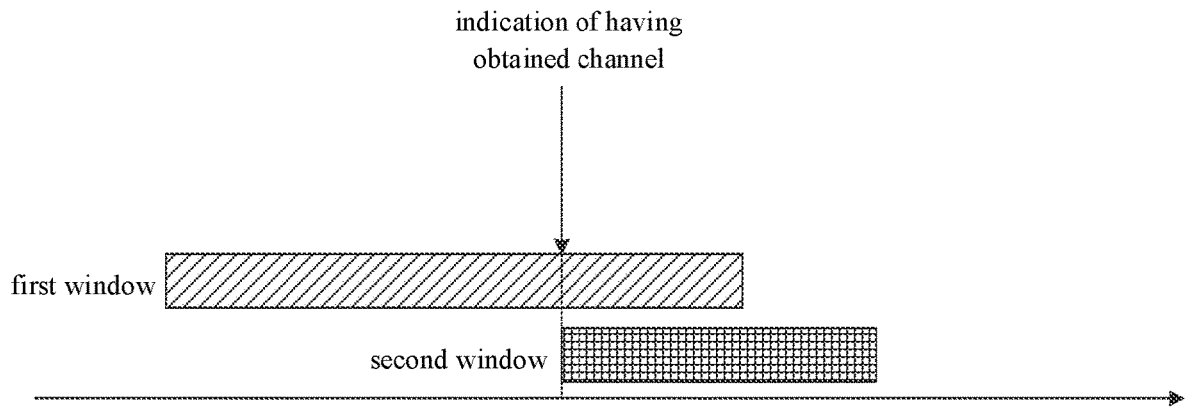
FIG. 5 is a schematic diagram illustrating a relationship between a first window and a second window in a method for receiving a downlink signal according to an exemplary embodiment of the disclosure.
Figure 6:
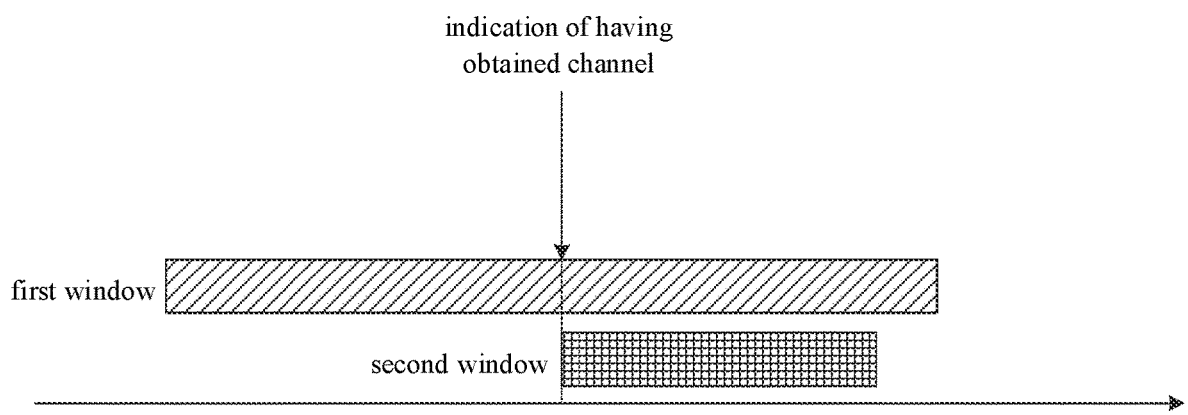
FIG. 6 is a schematic diagram illustrating another relationship between a first window and a second window in a method for receiving a downlink signal according to an exemplary embodiment of the disclosure.

With reference to FIG. 5 and FIG. 6, the terminal waits for receiving the target downlink signal within the first window, receives the indication of having obtained channel sent by the base station at the time point A of the first window, and does not receive the target downlink signal before the time point A, then the terminal launches the second window at the time point A and waits for receiving the target downlink signal within the second window. Alternatively, an end time point of the second window is earlier than that of the first window, or later than that of the first window.

In conclusion, with the method provided by this embodiment, when the target downlink signal is not received within the first window but the indication of having obtained channel is received within the first window, the second window is launched, and the target downlink signal continues to be waited for receiving within the second window. In this way, the target downlink signal may continue to be waited by launching the second window under the condition that the base station is likely to send the target downlink signal to the terminal, thereby avoiding extra power consumption caused by the terminal performing unnecessary monitoring for a long period when the base station cannot occupy the unlicensed band.

The above method is applicable to multiple scenarios such as a DRX transmission scenario, a configure grant scenario and a random access scenario. In different embodiments, the action at step 401 may be at least one of:

1. waiting for receiving first PDCCH scheduling information within a DRX on duration;

2. waiting for receiving a second PDCCH scheduling information within a DRX inactivity timer;

3. waiting for receiving first scheduling information during an operation of a DRX retransmission timer, in which the first scheduling information is retransmission scheduling information or new transmission scheduling information of a hybrid automatic repeat request (HARQ) process corresponding to the DRX retransmission timer;

4. waiting for receiving a random access response (RAR) within a random access response window;

5. waiting for receiving a contention resolution message within a random access contention resolution window;

6. waiting for receiving second scheduling information within a configured grant timer, in which the second scheduling information is retransmission scheduling information or new transmission scheduling information of a HARQ process corresponding to the configured grant timer;

7. waiting for receiving HARQ feedback information within the configured grant timer, in which the HARQ feedback information is feedback information corresponding to the configured grant timer.

Figure 7:
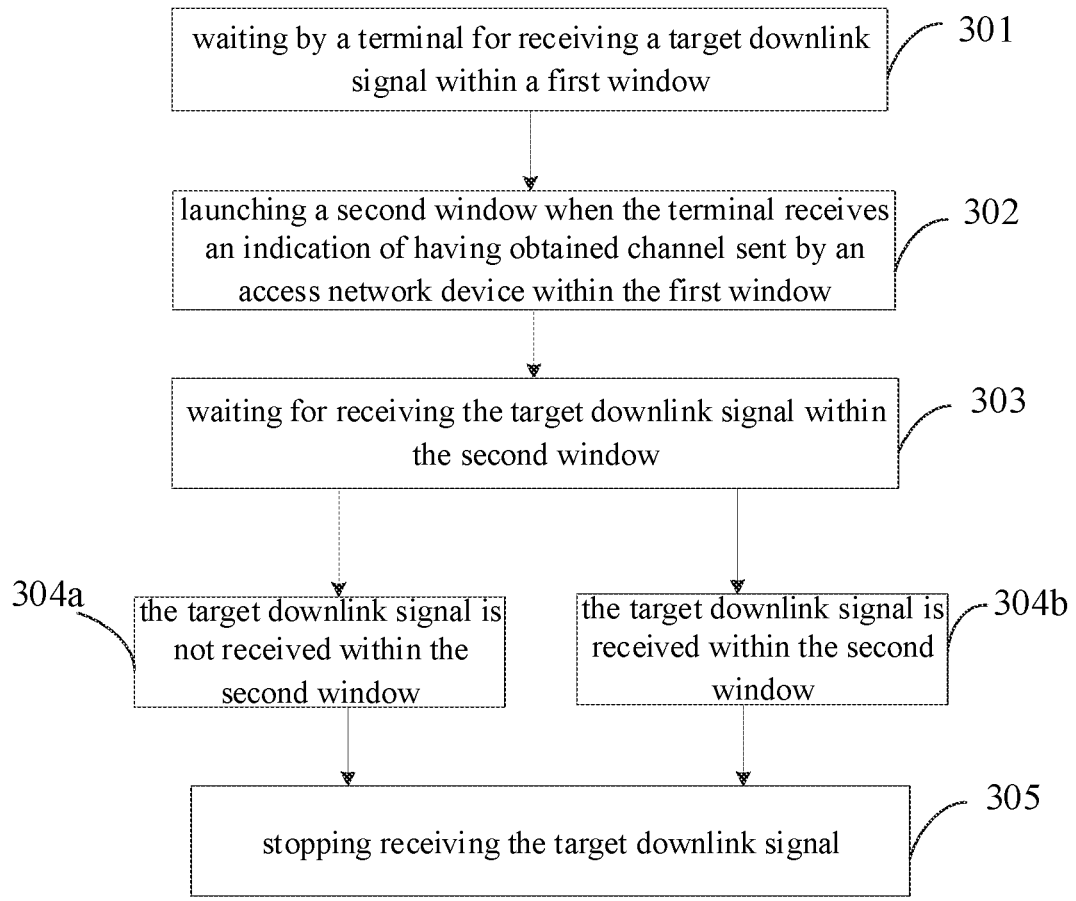
FIG. 7 is a flow chart illustrating a method for receiving a target downlink signal according to an exemplary embodiment of the disclosure.

Based on the alternative embodiment illustrated in FIG. 4, FIG. 7 is a flow chart illustrating a method for receiving a target downlink signal according to an exemplary embodiment of the disclosure. After step 303, the method also includes steps 304a, 304b and 305.

At step 304a, the target downlink signal is not received within the second window. The second window is closed due to timeout when the target downlink signal is not received within the second window.

At step 305, the target downlink signal is stopped receiving.

When the second window is closed due to timeout, and the terminal still does not receive the target downlink signal, the terminal stops waiting for receiving the target downlink signal.

It should be noted that, when the end time point of the second window is earlier than that of the first window, the terminal may stop waiting for receiving the target downlink signal when the target downlink signal is not received within the first window, which is not limited in this embodiment.

At step 304b, the target downlink signal is received within the second window.

The second window is closed at the moment of receiving the target downlink signal in the second window, without waiting for timeout of the second window. "Closing the second window" means closing the timer corresponding to the second window.

At step 305, the target downlink signal is stopped receiving.

It should be noted that, steps 304a and 304b are parallel, and an execution sequence relationship between steps 304a and 304b is not limited in embodiments of the disclosure.

It should also be noted that steps 304b and 305 are applicable to a scenario where there is one target downlink signal, such as a DRX retransmission timer, a random access response window and a random access contention resolution window. Steps 304b and 305 are not applicable to a scenario where there are multiple target downlink signals, such as a scenario where the PDCCH scheduling information needs to be continuously received within DRX on duration and the DRX inactivity timer.

In conclusion, with the method provided in this embodiment, when the target downlink signal is received (or not received) within the second window, the timer of the second window is closed and the target downlink signal is stopped receiving, thereby reducing the power consumption of the terminal for monitoring the target downlink signal.

Figure 8:
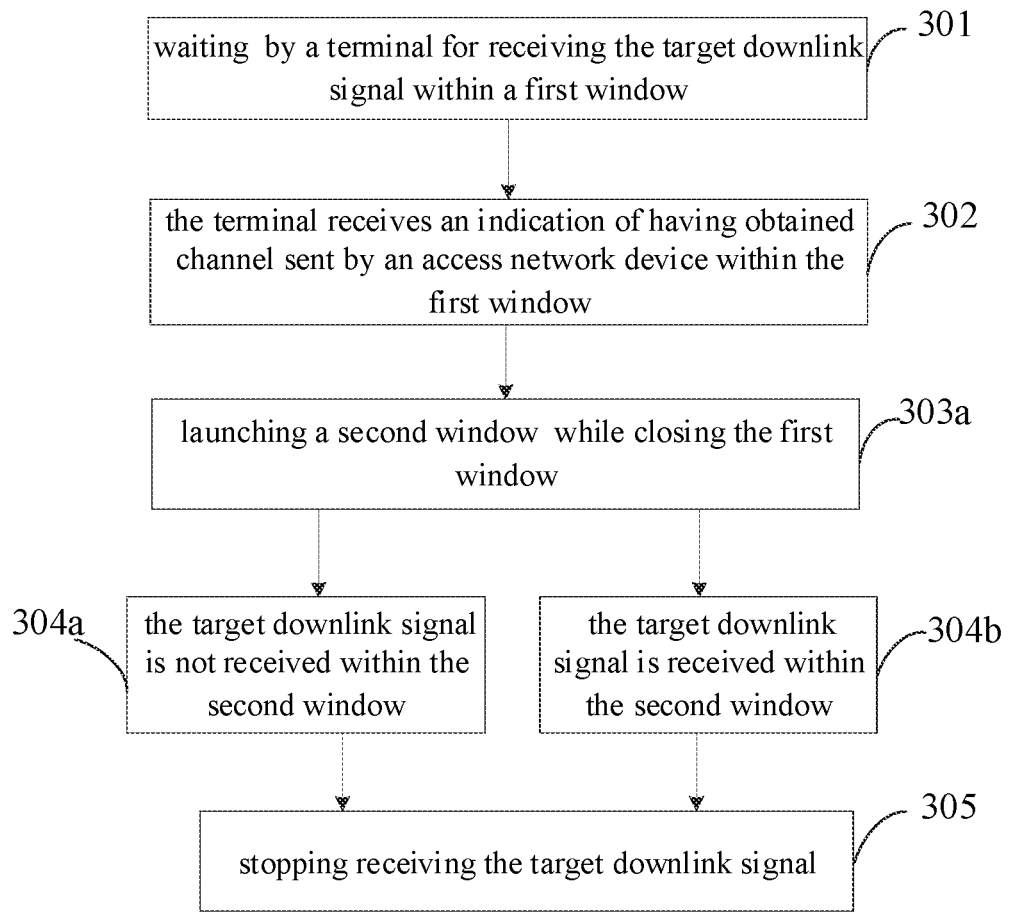
FIG. 8 is a flow chart illustrating a method for receiving a target downlink signal according to another exemplary embodiment of the disclosure.

Based on the alternative embodiment illustrated in FIG. 4 or FIG. 7, the above step 303 may be replaced with step 303a, as illustrated in FIG. 8.

At step 303a, the second window is launched while the first window is closed.

Since the first window is not timed out when the indication of having obtained channel is received at the time point A within the first window, the terminal may simultaneously close the first window while launching the second window at the time point A. "Closing the first window" means closing the timer corresponding to the first window.

Figure 9:
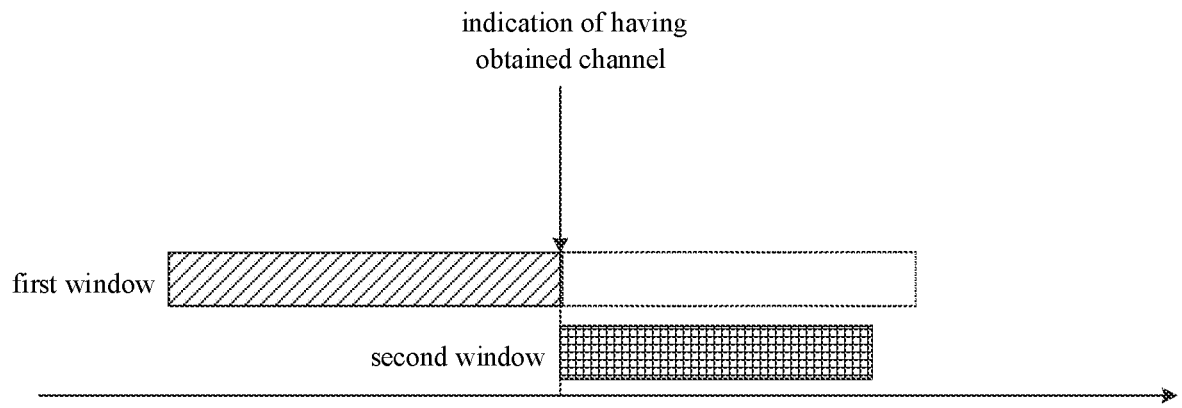
FIG. 9 is a schematic diagram illustrating yet another relationship between a first window and a second window in a method for receiving a downlink signal according to an exemplary embodiment of the disclosure.

Referring to FIG. 9, when the terminal receives the indication of having obtained channel sent by the access network device within the first window, the first window is immediately stopped, the second window is launched at the same time, and the terminal continues to wait for receiving the target downlink signal within the second window.

In conclusion, with the method provided in this embodiment, the first window is stopped while the second window is launched, which may reduce additional calculation overhead caused by two parallel windows, and only need to keep the second window to continue waiting for receiving the target downlink signal.

In an alternative embodiment based on FIG. 4, FIG. 7 or FIG. 8, the duration of the first window and/or the second window is configured by the access network device to the terminal through broadcast messages or proprietary signaling. There are multiple different configurations of the first window and/or the second window.

In some embodiments, the duration of the first window and/or the duration of the second window is a common duration, and the common duration is a duration shared by at least two logical channels. For example, all logical channels adopt a same duration of the first window and/or a same duration of the second window.

In some embodiments, for at least two logical channels, the duration of the first window is different, and/or, for at least logical channels, the duration of the second window is different. That is, the duration of the first window and/or the duration of the second window corresponding to each logical channel is independently configured, there are some logical channels for which the duration of the first window and/or the duration of the second window is the same, and there are some logical channels for which the duration of the first window and/or the duration of the second window is different.

In some embodiments, the duration of the first window corresponding to uplink transmission and downlink transmission are different, and/or the duration of the second window corresponding to the uplink transmission and the downlink transmission are different. That is, the duration of the first window and/or the duration of the second window corresponding to the uplink transmission and the downlink transmission are independently configured. For example, the duration of the second window of the downlink transmission is infinite, which means that the UE always waits for the base station to schedule the downlink retransmission. The duration of the second window of the uplink transmission is finite, which means that the UE only waits for the base station to schedule uplink retransmission/new transmission for a certain time period, and then does not wait any longer.

In conclusion, with the method provided in this embodiment, different durations of the first window and/or the second window nay be configured for different logical channels, and different durations of the first window and/or the second window may also be configured for the uplink transmission and the downlink transmission, thereby increasing the configuration flexibility of the first window and/or the second window.

In an alternative embodiment based on FIG. 4 or FIG. 7, when the terminal does not receive the target downlink signal within the first window or the second window, it is considered that a connection for this transmission is faulty and there is a need to reestablish a connection, or the terminal needs to re-initiate a random access procedure.

In some embodiments, when the first window ends, the terminal initiates connection reestablishment, reports RLF or reinitiates a random access procedure. "The first window ends" refers to an end of the first window due to timeout, excluding early termination. For example, when the end time point of the first window is later than that of the second window, and the first window ends due to the timeout, the terminal initiates connection reestablishment, reports RLF or reinitiates the random access procedure.

In some embodiments, the terminal stops the random access procedure when the first window ends and the first window is a random access response window. For example, when the end time point of the first window is later than the end time point of the second window, and the first window ends due to timeout, the terminal stops the current random access procedure.

In some embodiments, the terminal waits for receiving the target downlink signal within the second window when the first window ends but the second window does not end, and the terminal initiates the connection reestablishment, reports the RLF or reinitiates the random access procedure when the target downlink signal is not received within the second window.

The above methods are schematically explained based on different application scenarios.

Scenario 1: the first window is a window corresponding to DRX on duration, and the UE waits for the first PDCCH scheduling information sent by the base station during the DRX on duration.

Figure 10:
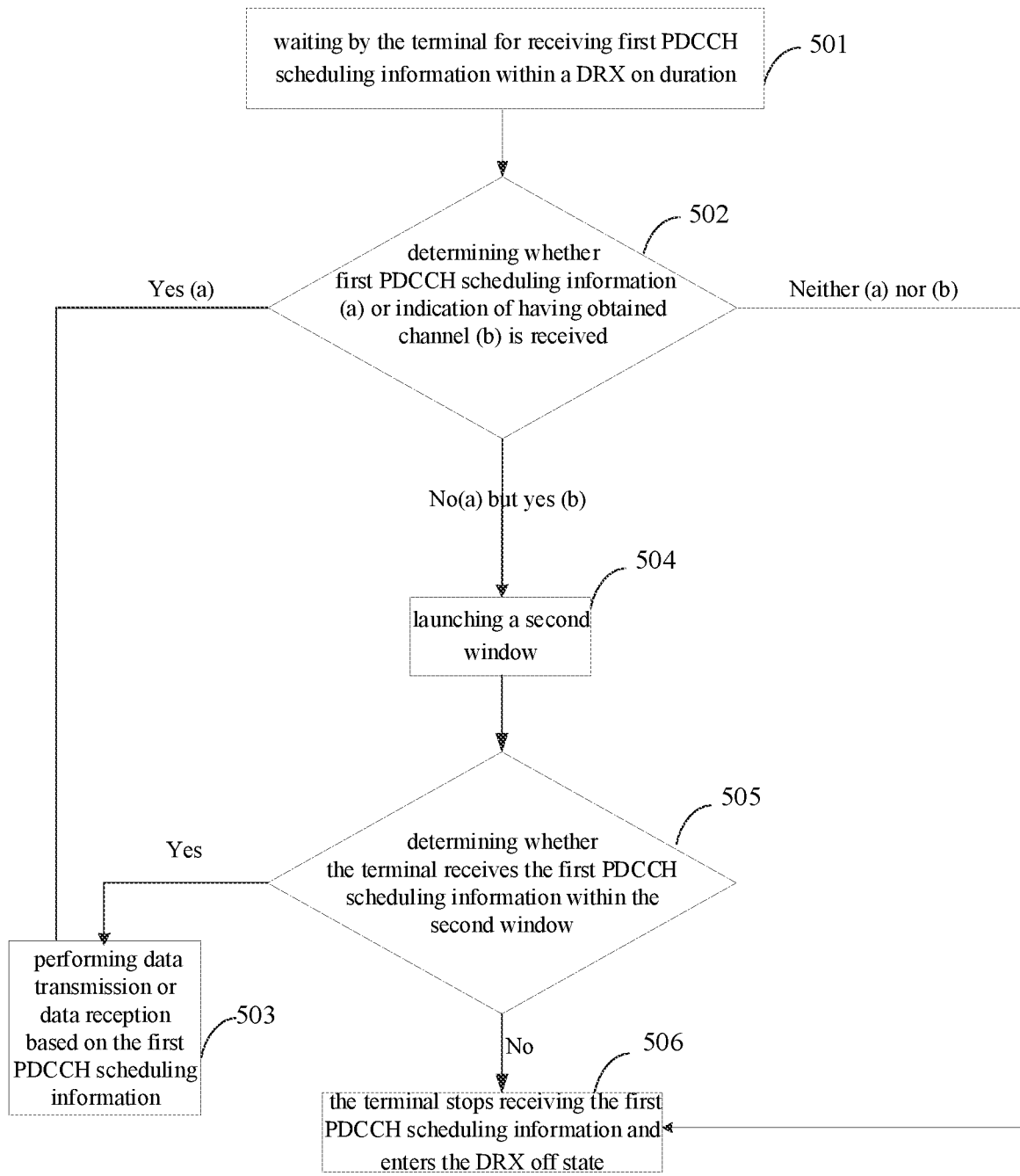
FIG. 10 is a schematic diagram illustrating still another relationship between a first window and a second window in a method for receiving a downlink signal according to an exemplary embodiment of the disclosure.

FIG. 10 is a flow chart illustrating a method for receiving a target downlink signal according to an exemplary embodiment of the disclosure. The method may be executed by the terminal in FIG. 1, and applicable to a scenario where the uplink transmission and the downlink transmission is performed by using the unlicensed band. The method includes the following.

At step 501, the terminal waits for receiving the first PDCCH scheduling information during the DRX on duration.

The DRX cycle includes a DRX on duration and a DRX off.

The terminal is in a wake-up state during the DRX on duration, and monitors PDCCH subframes for waiting for receiving the first PDCCH scheduling information. Alternatively, a timer corresponding to the DRX on duration is launched in the terminal, and the operation duration of the timer is the first window.

At step 502, it is determined whether the first PDCCH scheduling information or an indication of having obtained channel is received.

Step 503 is executed when the first PDCCH scheduling information is received during the DRX on duration.

Step 504 is executed when the first PDCCH scheduling information is not received during the DRX on duration, but the indication of having obtained channel sent by the access network device is received.

When neither the first PDCCH scheduling information nor the indication of having obtained channel sent by the access network device is received during the DRX on duration, step 506 is executed.

At step 503, data transmission or data reception is performed based on the first PDCCH scheduling information.

Upon receiving the first PDCCH scheduling information, the terminal performs uplink data transmission or downlink data reception based on time-frequency resources indicated by the first PDCCH scheduling information.

At step 506, the terminal stops receiving the first PDCCH scheduling information and enters the DRX off state.

When neither the first PDCCH scheduling information nor the indication of having obtained channel sent by the access network device is received, the terminal stops waiting for receiving the first PDCCH scheduling information and enters the DRX off state.

At step 504, the second window is launched.

When the terminal receives the indication of having obtained channel sent by the access network device during the DRX on duration, the terminal launches the second window and continues to wait for receiving the first PDCCH scheduling information within the second window.

Alternatively, a size of the second window is not greater than that of the first window.

At step 505, it is determined whether the terminal receives the first PDCCH scheduling information within the second window.

The above step 503 is executed when the terminal receives the first PDCCH scheduling information within the second window, and the above step 506 is executed when the terminal does not receive the first PDCCH scheduling information within the second window.

In conclusion, with the method provided in this embodiment, the second window is launched to wait for receiving the first PDCCH scheduling information when the indication of having obtained channel is received during the DRX on duration. Compared with directly setting the timer corresponding to the DRX on duration to a larger value, the power consumption of the UE during the DRX on duration may be effectively reduced.

Scenario 2: the first window is a window corresponding to the DRX inactivity timer, and the UE waits for the second PDCCH scheduling information sent by the base station during the DRX inactivity timer.

Figure 11:
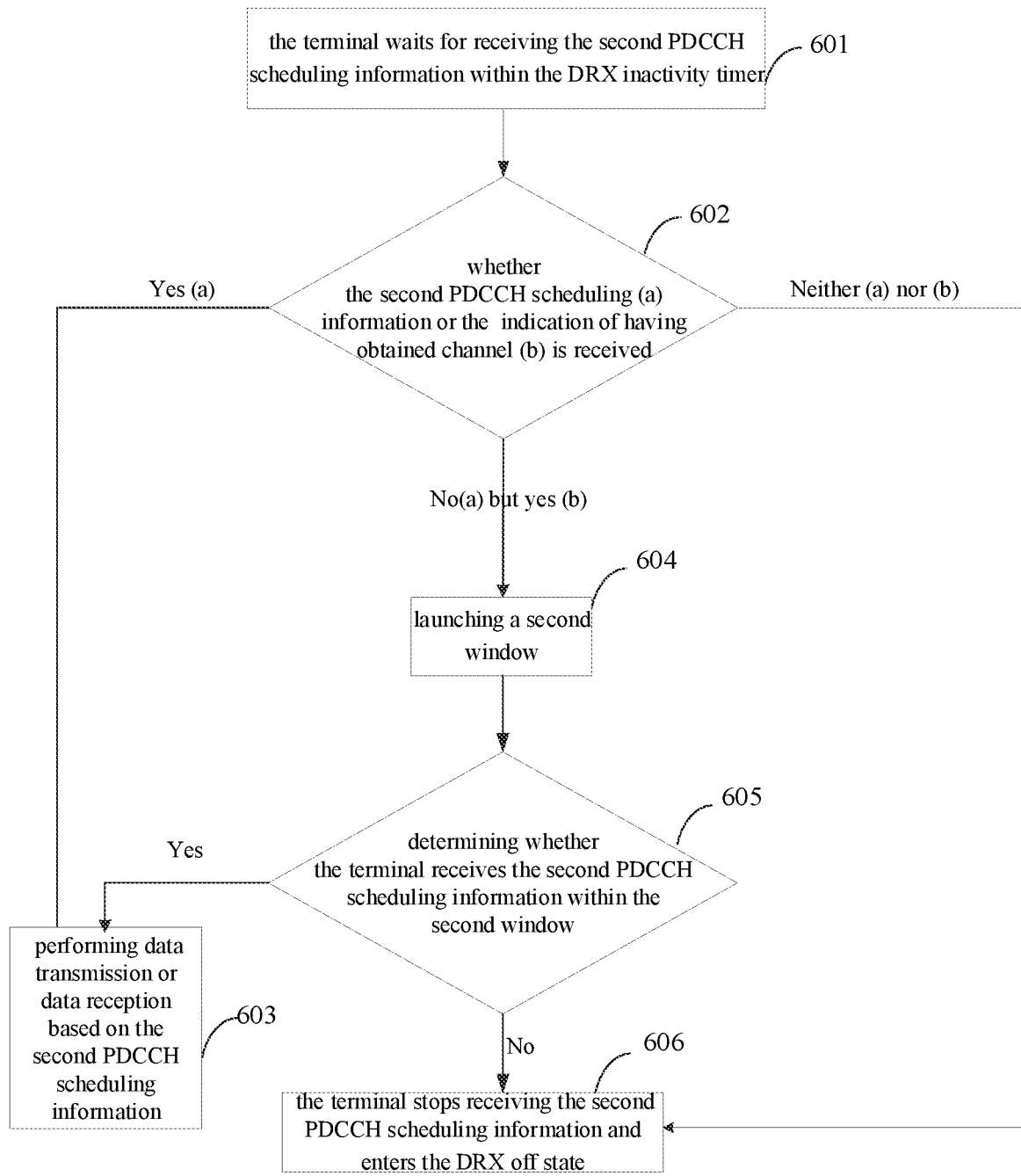
FIG. 11 is a flow chart illustrating a method for receiving a target downlink signal according to an exemplary embodiment of the disclosure.

FIG. 11 is a flow chart illustrating a method for receiving a target downlink signal according to an exemplary embodiment of the disclosure. The method may be executed by the terminal in FIG. 1, and is applicable to a scenario where the uplink transmission and downlink transmission is performed by using the unlicensed band. The method includes the following.

At step 601, the terminal waits for receiving the second PDCCH scheduling information within the DRX inactivity timer.

When the UE receives a scheduling message during the DRX on duration, the UE may launch a "drx-Inactivity-Timer" and monitor PDCCH scheduling information in each subframe during the DRX on duration.

At step 602, it is determined whether the second PDCCH scheduling information or the indication of having obtained channel is received.

Step 603 is executed when the second PDCCH scheduling information is received within the DRX inactivity timer.

Step 604 is executed when the second PDCCH scheduling information is not received within the DRX inactivity timer, but the indication of having obtained channel sent by the access network device is received.

When neither the second PDCCH scheduling information nor the indication of having obtained channel sent by the access network device is received within the DRX inactivity timer, step 606 is executed.

At step 603, the terminal performs data transmission or data reception based on the second PDCCH scheduling information.

Upon receiving the second PDCCH scheduling information, the terminal performs uplink data transmission or downlink data reception based on time-frequency resources indicated by the second PDCCH scheduling information.

At step 606, the terminal stops receiving the second PDCCH scheduling information and enters the DRX off state.

When neither the first PDCCH scheduling information nor the indication of having obtained channel sent by the access network device is received, the terminal stops waiting for receiving the first PDCCH scheduling information and enters the DRX off state.

At step 604, the second window is launched.

When the terminal receives the indication of having obtained channel sent by the access network device during the DRX inactivity timer, the terminal launches the second window and continues to wait for receiving the first PDCCH scheduling information within the second window.

Alternatively, the size of the second window is not greater than that of the first window.

At step 605, it is determined whether the terminal receives the second PDCCH scheduling information within the second window.

The above step 603 is executed when the second PDCCH scheduling information is received within the second window.

The above step 606 is executed when the second PDCCH scheduling information is not received within the second window.

In conclusion, with the method provided in this embodiment, the second window is launched to wait for receiving the second PDCCH scheduling information when the indication of having obtained channel is received during the DRX inactivity timer. Compared with directly setting the timer corresponding to the DRX inactivity timer to the larger value, the power consumption of the UE during the DRX inactivity timer may be effectively reduced.

Scenario 3: the first window is the window corresponding to the DRX retransmission timer, and the UE waits for HARQ feedback information sent by the base station within the window corresponding to the DRX retransmission timer.

Figure 12:
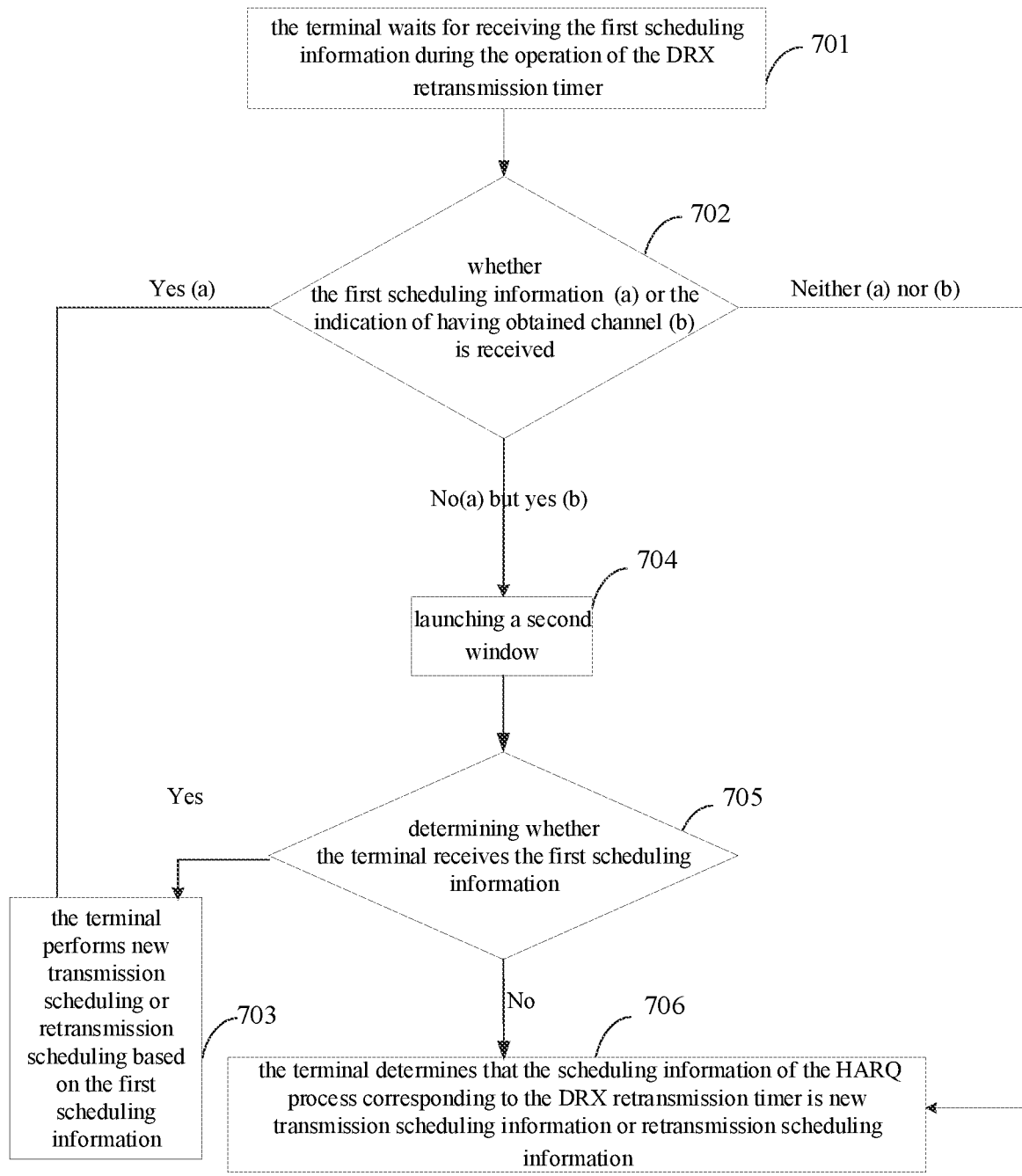
FIG. 12 is a flow chart illustrating a method for receiving a target downlink signal according to an exemplary embodiment of the disclosure.

FIG. 12 is a flow chart illustrating a method for receiving a target downlink signal according to an exemplary embodiment of the disclosure. The method may be executed by the terminal in FIG. 1, and is applicable to a scenario where the uplink transmission and the downlink transmission are performed by using the unlicensed band. The method includes followings.

At step 701, the terminal waits for receiving the first scheduling information during the operation of the DRX retransmission timer.

The terminal starts the DRX retransmission timer after sending uplink data to the access network device. Each DRX retransmission timer corresponds to its own HARQ process.

Alternatively, there are multiple HARQ processes in parallel, for example, up to 8.

The DRX retransmission timers corresponding to respective HARQ processes are independent of each other.

Alternatively, each HARQ process may save a New-Data Indicator (NDI) value. The value uses 1 bit to indicate whether scheduled data is newly transmitted or retransmitted. When the NDI is flipped, it represents the new transmission schedule. The first scheduling information is the NDI of the HARQ process corresponding to the DRX retransmission timer.

At step 702, it is determined whether the first scheduling information or an indication of having obtained channel is received.

Step 703 is executed when the first scheduling information is received during the operation of the DRX retransmission timer.

When the first scheduling information is not received during the operation of the DRX retransmission timer, but the indication of having obtained channel sent by the access network device is received, step 704 is executed.

When neither the first scheduling information nor the indication of having obtained channel sent by the access network device is received during the operation of the DRX retransmission timer, step 706 is executed.

At step 703, the terminal retransmits data or newly transmits data based on the first scheduling information.

Upon receiving the first scheduling information, when the first scheduling information is an ACK, the terminal newly transmits a following piece of uplink data, and when the first scheduling information is a NACK, the terminal retransmits a latest piece of uplink data.

At step 706, the terminal determines that the scheduling information of the HARQ process corresponding to the DRX retransmission timer is new transmission scheduling information or retransmission scheduling information.

When neither the first scheduling information nor the indication of having obtained channel sent by the access network device is received during the operation of the DRX retransmission timer, the terminal may consider that there is no new transmission scheduling information or retransmission scheduling information, and may not perform other processing.

Alternatively, when neither the first scheduling information nor the indication of having obtained channel sent by the access network device is received during the operation of the DRX retransmission timer, the terminal considers that the HARQ process receives the new transmission scheduling information and starts to newly transmit a following piece of uplink data.

Alternatively, when neither the first scheduling information nor the indication of having obtained channel sent by the access network device is received during the operation of the DRX retransmission timer, the terminal considers that the HARQ process receives the retransmission scheduling information and retransmits the latest piece of uplink data.

At step 704, the second window is launched.

When the indication of having obtained channel is received at the time point A in the DRX retransmission timer and the first scheduling information is not received before the time point A, the terminal launches the second window at the time point A, continues to wait for receiving the first scheduling information within the second window, and proceeds to step 705.

Alternatively, the size of the second window is not greater than that of the first window.

At step 705, it is determined whether the terminal receives the first scheduling information.

When the first scheduling information is received within the second window, the above step 703 is executed.

When the first scheduling information is not received within the second window, the above step 706 is executed.

In conclusion, with the method provided in this embodiment, the second window is launched to wait for receiving the first scheduling information when the indication of having obtained channel is received during the DRX retransmission timer. Compared with directly setting the DRX retransmission timer to a larger value, the power consumption of the UE during the DRX retransmission timer can be effectively reduced.

Scenario 4: the first window is a random access response window where the UE waits for receiving a random access response (RAR).

Figure 13:
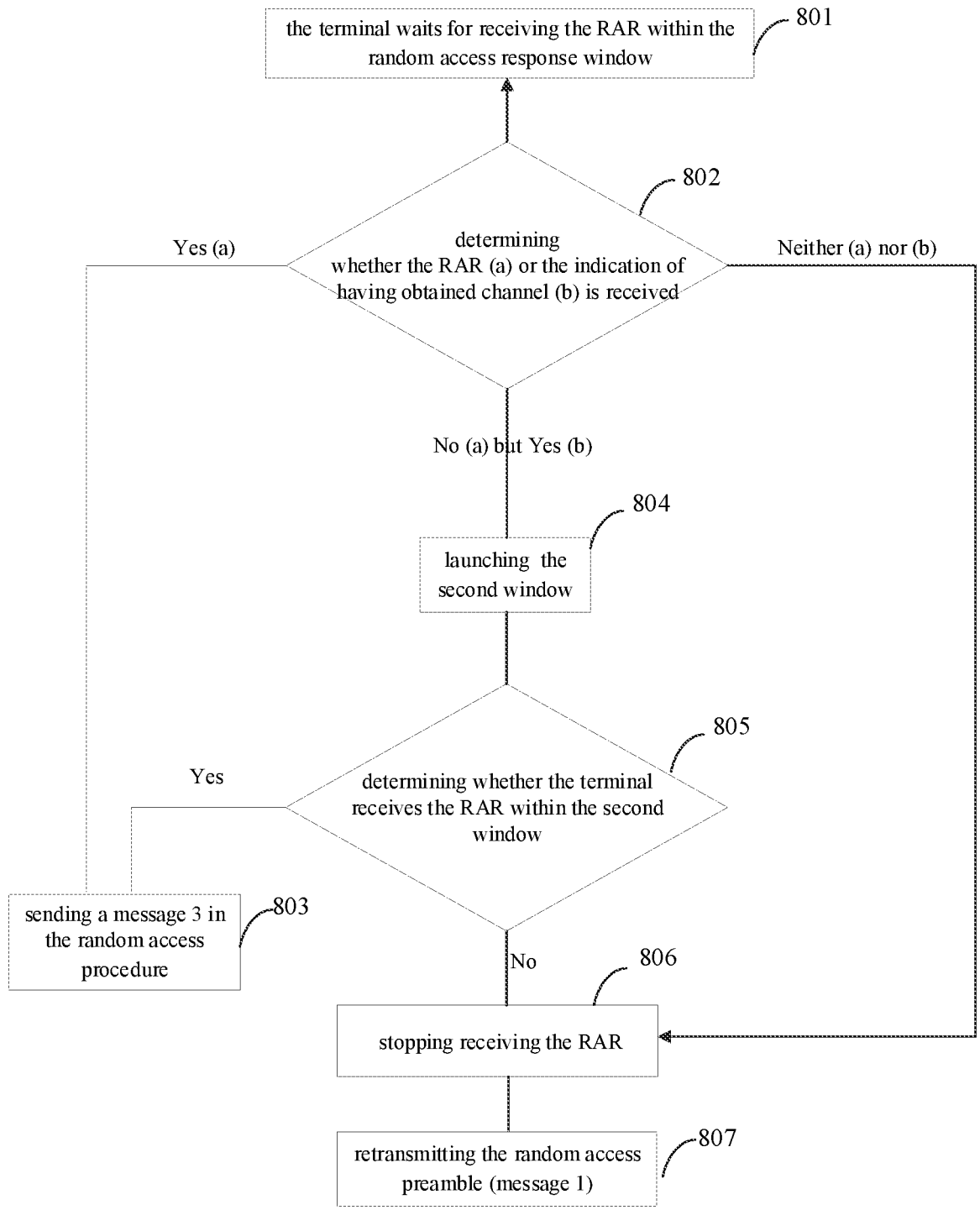
FIG. 13 is a flow chart illustrating a method for receiving a target downlink signal according to an exemplary embodiment of the disclosure.

FIG. 13 is a flow chart illustrating a method for receiving a target downlink signal according to an exemplary embodiment of the disclosure. The method may be executed by the terminal in FIG. 1, and is applicable to a scenario where random access is performed by employing the unlicensed band. The method includes the following.

At step 801, the terminal waits for receiving the RAR within the random access response window.

In the random access procedure, the terminal first sends a random access preamble, that is, a message 1, to the access network device.

After the message 1 is sent, the terminal starts a timer corresponding to the random access response. The timer corresponding to the random access response is called the random access response window for short. The terminal waits for receiving the RAR in the random access response window.

At step 802, it is determined whether the RAR or an indication of having obtained channel is received.

When the RAR is received within the random access response window, step 803 is executed.

When the RAR is not received within the random access response window, but the indication of having obtained channel sent by the access network device is received, step 804 is executed.

When neither the RAR nor the indication of having obtained channel sent by the access network device is received within the random access response window, step 806 is executed.

At step 803, the terminal sends a message 3 in the random access procedure to the access network device.

The terminal sends the message 3 in the random access procedure to the access network device after receiving the RAR (message 2) sent by the access network device.

At step 806, the RAR is stopped receiving.

When the terminal does not receive the RAR or the indication of having obtained channel within the random access response window, the terminal stops waiting for the RAR.

At step 804, the second window is launched.

The terminal launches the second window at a time point A and continues to wait for receiving the RAR in the second window when receiving the indication of having obtained channel sent by the access network device at the time point A in the random access response window.

At step 805, it is determined whether the terminal receives the RAR within the second window.

When the RAR is received within the second window, the above step 803 is executed.

When the RAR is not received within the second window, the above step 806 is executed.

At step 807, the random access preamble (message 1) is retransmitted.

When neither the RAR nor the indication of having obtained channel sent by the access network device is received within the random access response window, the terminal may also retransmit the random access preamble to the access network device and restart the random access procedure once.

In conclusion, with the method provided in this embodiment, the second window is launched to wait for receiving the RAR when the indication of having obtained channel is received within the random access response window. Compared with directly setting the random access response window to a larger value, the power consumption of the UE in the random access response window can be effectively reduced.

In an alternative embodiment based on FIG. 13, for non-competitive access not triggered by a beam failure recovery, since the second window prolongs a period for receiving the RAR, the terminal may receive multiple RARs with the same RA-RNTI within the second window, thereby causing a problem that the terminal may not successfully receive the RAR corresponding to itself. At this time, within the second window, the terminal receives the first RAR sent by the access network device. It is considered that the RAR corresponding to the terminal is received when a first RA-RNTI for scheduling the first RAR is consistent with a second RA-RNTI value of the time-frequency resource for the terminal to send the random access preamble, and the RAPID in the first RAR corresponds to the random access preamble corresponding to the terminal.

In a non-competitive random access scenario, the base station may assign a designated random access preamble to the UE. Therefore, even if the RA-RNTI is ambiguous, as long as the random access preamble is uniquely assigned to the UE within a reception attempt period, the RAR corresponding to the terminal may be uniquely determined in combination with the RA-RNTI and the random access preamble.

In an alternative embodiment based on FIG. 13, when the terminal requests a system message (belonging to an SIB in OtherSI) from the access network device by using the message 1 in the random access procedure, the first window is a window of the message 1 initiated by requesting the system message, and the terminal receives the second RAR of all RA-RNTIs within the first window or the second window. When the RAPID in the second RAR corresponds to the random access preamble selected by the terminal, it is considered that the RAR corresponding to the terminal is received.

In another alternative embodiment based on FIG. 13, when the terminal requests the system message (belonging to SIB in OtherSI) from the access network device by using the message 1 in the random access procedure, the first window is the window of the message 1 initiated by requesting the system message. When a group of RA-RNTIs is predefined in the communication protocol, and different RA-RNTIs are corresponding to requesting different system messages, the terminal receives a third RAR scheduled by the designated RA-RNTI within the first window or the second window. When the RAPID in the third RAR corresponds to the random access preamble selected by the terminal, it is considered that the RAR corresponding to the terminal is received.

Scenario 5: the first window is a contention resolution window in the random access procedure, that is, a window corresponding to a message 3. After sending the message 3 to the access network device, the terminal launches a timer corresponding to the message 3 and waits for receiving a message 4 for resolving the competition conflict.

Figure 14:
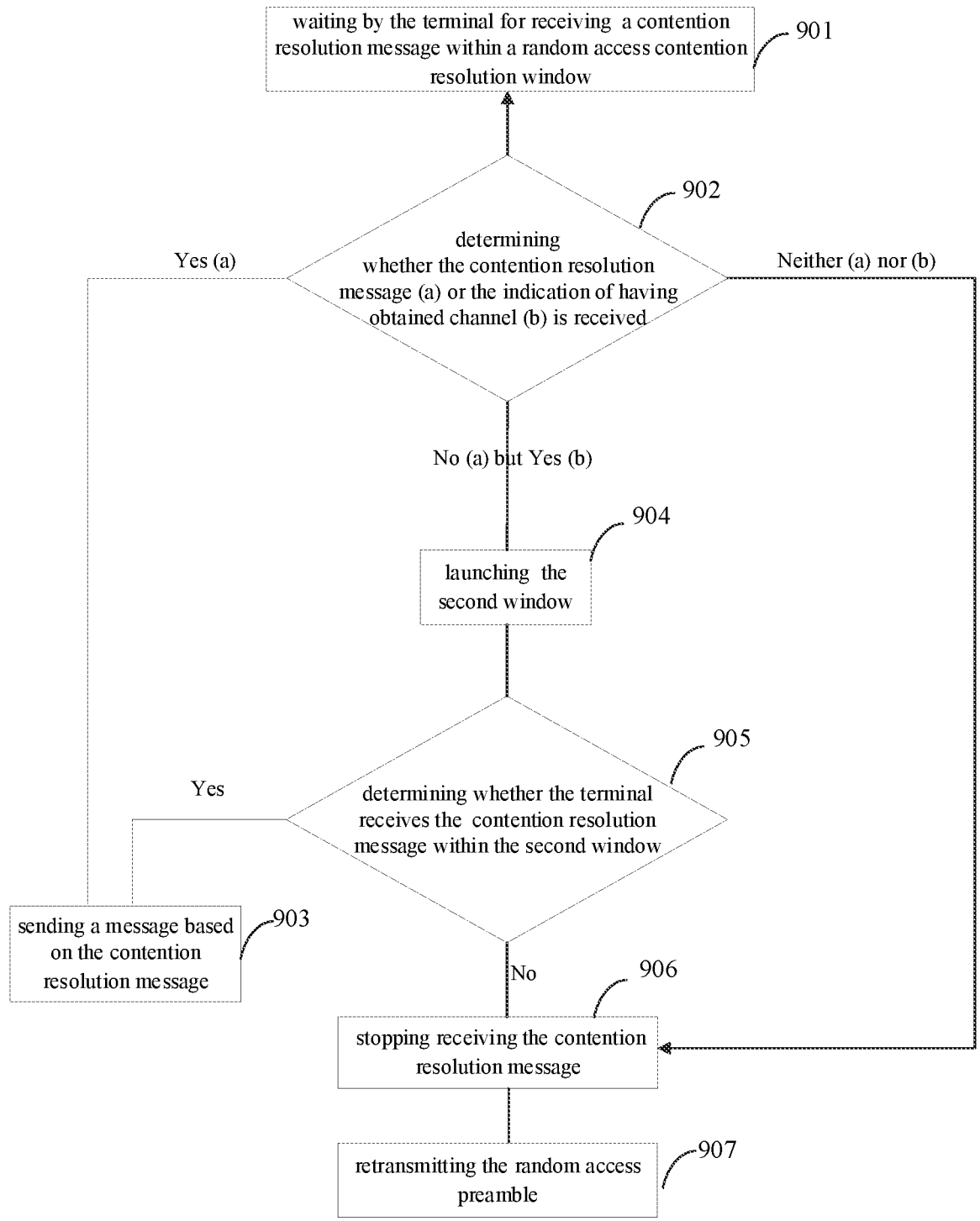
FIG. 14 is a flow chart illustrating a method for receiving a target downlink signal according to an exemplary embodiment of the disclosure.

FIG. 14 is a flow chart illustrating a method for receiving a target downlink signal according to an exemplary embodiment of the disclosure. The method may be executed by the terminal in FIG. 1, and applicable to a scenario where the random access is performed by using the unlicensed band. The method includes the following.

At step 901, the terminal waits for receiving a contention resolution message within a random access contention resolution window.

In a random access procedure, the terminal first sends a random access preamble, that is, a message 1, to the access network device. The access network device sends an RAR, that is, a message 2, to the terminal.

Then, the terminal sends the message 3 to the access network device. After sending the message 3, the terminal starts the timer corresponding to the message 3. The timer corresponding to the message 3 is called the contention resolution window for short. The terminal waits for receiving the contention resolution message (message 4) within the contention resolution window.

At step 902, it is determined whether the contention resolution message or an indication of having obtained channel is received.

Step 903 is executed when the contention resolution message is received within the contention resolution window.

When the contention resolution message is not received within the contention resolution window, but the indication of having obtained channel sent by the access network device is received, step 904 is executed.

When neither the contention resolution message nor the indication of having obtained channel sent by the access network device is received within the contention resolution window, step 906 is executed.

At step 903, a connection with the access network device is established based on the contention resolution message.

After the contention resolution message is received, the random access is successful. The terminal accesses a cell corresponding to the access network device based on the contention resolution message, and establishes a corresponding bearer connection with the access network device.

At step 906, the contention resolution message is stopped receiving.

When neither the contention resolution message nor the indication of having obtained channel sent by the access network device is received, the terminal stops waiting for the contention resolution message. Alternatively, the terminal proceeds to step 907.

At step 904, the second window is launched.

When the terminal receives the indication of having obtained channel sent by the access network device at a time point A within the contention resolution window, the terminal launches the second window at the time point A and continues to wait for receiving the contention resolution message within the second window.

At step 905, it is determined whether the terminal receives the contention resolution message within the second window.

When the contention resolution message is received within the second window, the above step 903 is executed.

When the contention resolution message is not received within the second window, the above step 906 is executed.

At step 907, the random access preamble (message 1) is retransmitted.

When neither the RAR nor the indication of having obtained channel sent by the access network device is received within the random access response window, the terminal may also retransmit the random access preamble to the access network device and restart the random access procedure once.

In conclusion, with the method provided in this embodiment, the second window is launched to wait for receiving the contention resolution message when the indication of having obtained channel is received within the contention resolution window. Compared with directly setting the contention resolution window to a larger value, the power consumption of the UE within the contention resolution window can be effectively reduced.

Scenario 6: the first window is an operation duration of the HARQ timer of the configured grant, and the terminal waits for receiving the second scheduling information or the HARQ feedback information sent by the access network device during the configured grant.

Figure 15:
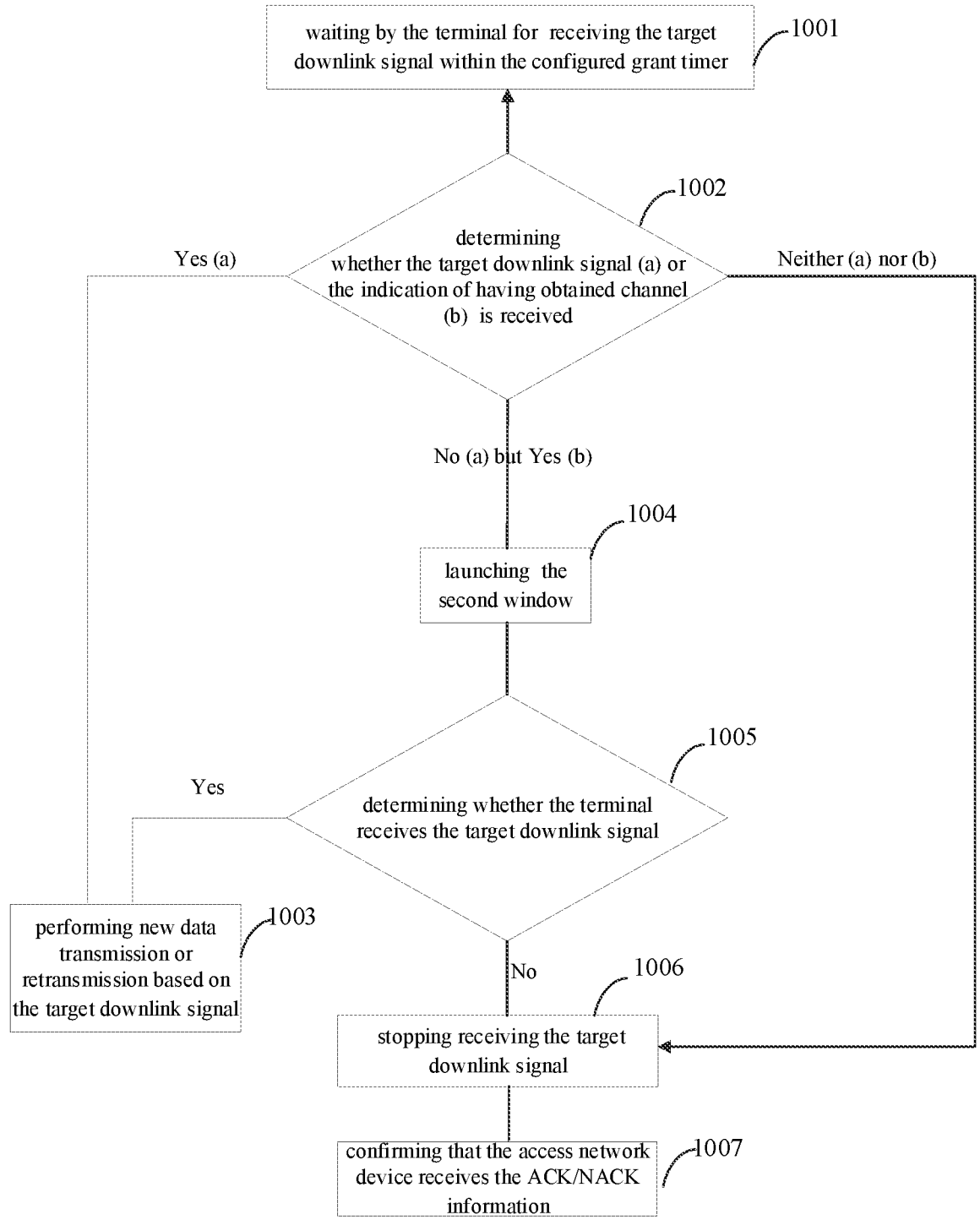
FIG. 15 is a flow chart illustrating a method for receiving a target downlink signal according to an exemplary embodiment of the disclosure.

FIG. 15 is a flow chart illustrating a method for receiving a target downlink signal according to an exemplary embodiment of the disclosure. The method may be executed by the terminal in FIG. 1, and applicable to a scenario where data transmission is performed by using the unlicensed band. The method includes the following.

At step 1001, the terminal waits for receiving the target downlink signal within the configured grant timer.

The terminal waits for receiving the target downlink signal within the confirmed grant timer after sending uplink data on the resource indicated by the confirmed grant.

The target downlink signal includes the second scheduling information or HARQ feedback information.

Alternatively, each HARQ process may save a New-Data Indicator (NDI) value. This value uses 1 bit to indicate whether the scheduled data is newly transmitted or retransmitted. When NDI is flipped, it represents the new transmission schedule. The second scheduling information is NDI of the HARQ process corresponding to the configured grant.

Alternatively, the HARQ feedbACK information includes an ACK or NACK.

At step 1002, it is determined whether the target downlink signal or an indication of having obtained channel is received.

Step 1003 is executed when the target downlink signal is received within the configured grant timer.

When the target downlink signal is not received within the configured grant timer, but the indication of having obtained channel sent by the access network device is received, step 1004 is executed.

When neither the target downlink signal nor the indication of having obtained channel sent by the access network device is received within the configured grant timer, step 1006 is executed.

At step 1003, new data transmission or retransmission is performed based on the target downlink signal.

When the target downlink signal is the second scheduling information, the terminal newly transmits a following piece of uplink data when receiving the new transmission scheduling information, and the terminal retransmits a latest piece of uplink data when receiving the retransmission scheduling information.

When the target downlink signal is HARQ feedback information, the terminal newly transmits a following piece of uplink data when receiving the ACK, and the terminal retransmits the latest piece of uplink data upon receiving NACK.

At step 1006, the target downlink signal is stopped receiving.

The terminal stops receiving the target downlink signal after having received the target downlink signal.

At step 1004, the second window is launched.

When the terminal receives the indication of having obtained channel at a time point A within the first window, the terminal launches the second window at the time point A, and continues to wait for receiving the target downlink signal within the second window.

At step 1005, it is determined whether the terminal receives the target downlink signal within the second window.

When the second scheduling information is received within the second window, the above step 1003 is executed.

When the second scheduling information is not received within the second window, the above step 1006 is executed.

At step 1007, it is confirmed that the access network device receives the ACK/NACK information.

Alternatively, the processing procedure is predefined in the communication protocol when neither the target downlink signal nor the indication of having obtained channel is received within the first window.

In some embodiments, when the terminal does not receive the target downlink signal or the indication of having obtained channel within the first window, the terminal considers that the retransmission schedule of the HARQ process corresponding to the configured grant is received.

In some embodiments, when the terminal does not receive the target downlink signal or the indication of having obtained channel within the first window, the terminal considers that the new transmission schedule of the HARQ process corresponding to the configured grant is received.

In some embodiments, when the terminal does not receive the target downlink signal or the indication of having obtained channel within the first window, the terminal considers that the ACK of the HARQ process corresponding to the configured grant is received.

In some embodiments, when the terminal does not receive the target downlink signal or the indication of having obtained channel within the first window, the terminal considers that the NACK of the HARQ process corresponding to the configured grant is received.

In conclusion, with the method provided in this embodiment, the second window is launched to wait for receiving the second scheduling information or the HARQ feedback information when the indication of having obtained channel is received within the configured grant timer. Compared with directly setting the configured grant timer to a larger value, the power consumption of the UE within the configured grant timer can be effectively reduced.

In an alternative embodiment based on the above embodiments, the first window may be an extended window. The extended window is a window extended based on a start window. The start window includes any one of a DRX retransmission timer, a DRX on duration, a DRX inactivity timer, a configured grant, a random access response window and a contention resolution window in a random access procedure.

Figure 16:
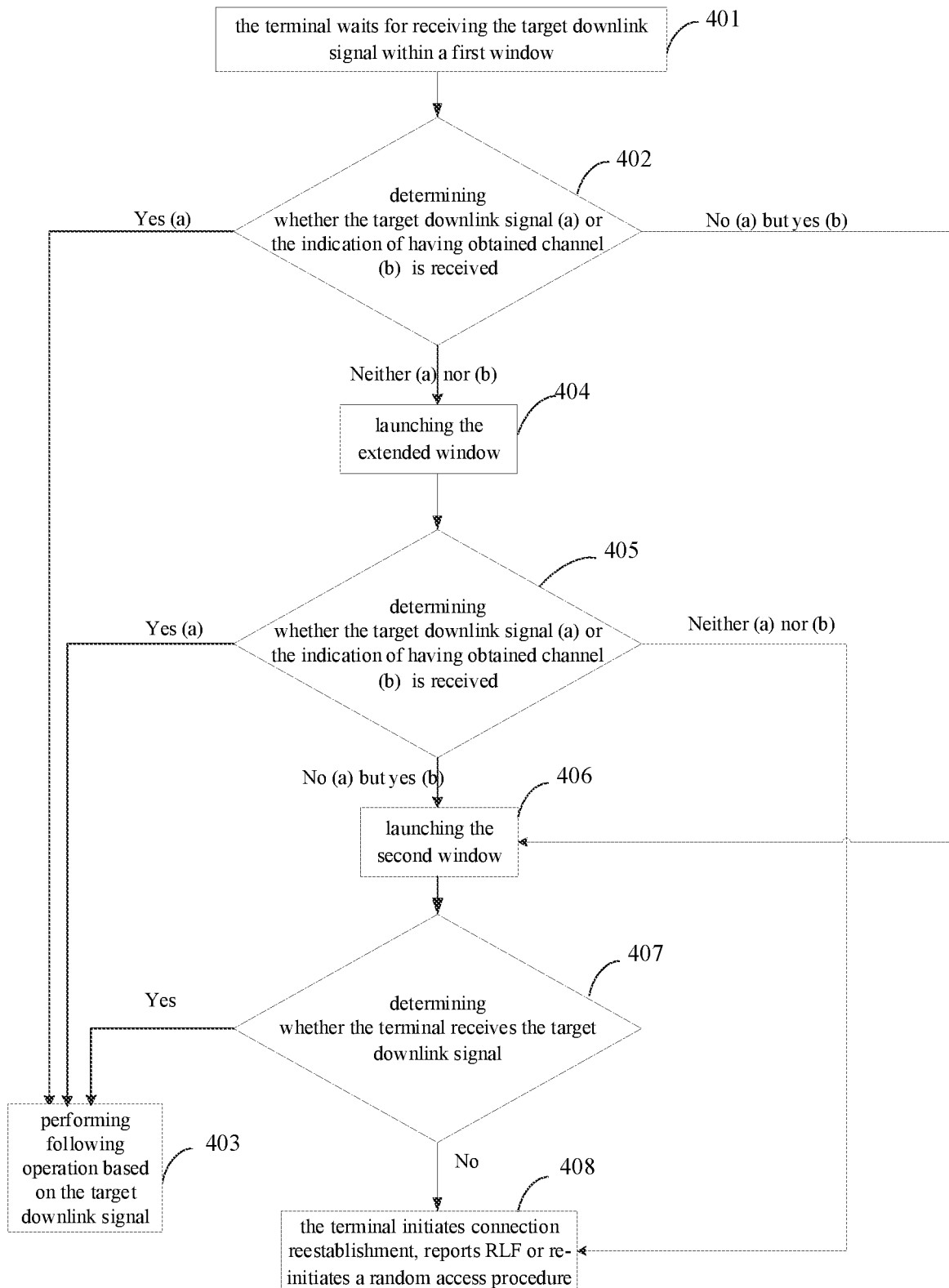
FIG. 16 is a flow chart illustrating a method for receiving a target downlink signal according to an exemplary embodiment of the disclosure.

FIG. 16 is a flow chart illustrating a method for receiving a target downlink signal according to an exemplary embodiment of the disclosure. The method may be executed by the terminal in FIG. 1, and applicable to a scenario where data transmission is performed using the unlicensed band. The method includes the following.

At step 401, the terminal waits for receiving the target downlink signal within a first window.

At step 402, the terminal determines whether the target downlink signal is received or whether the indication of having obtained channel sent by the access network device is received.

The target downlink signal and the indication of having obtained channel are the same as those described in the above embodiments, which are not be described in detail here.

At step 403, a following operation is performed based on the target downlink signal.

When the terminal receives the target downlink signal, the terminal performs the following operation based on the instruction or information in the target downlink signal.

At step 404, the extended window is launched.

The terminal launches the extended window to continue to wait for receiving the target downlink signal when neither receiving the target downlink signal nor the indication of having obtained channel within the first window.

Alternatively, a duration of the extended window is the same as that of the first window, or a ratio of the duration of the extended window to the duration of the first window conforms to a preset ratio.

Alternatively, the duration of the extended window is equal to a first difference. The first difference is a window size obtained by subtracting a pre-configured RAR from a duration triggered by the RA-RNTI. For the extended window of the random access response window, the size of the extended window is equal to a size obtained by subtracting a size of the RAR response window configured by the system from the duration represented by RA-RNTI. In the related art, in the communication protocol, the RA-RNTI may only represent a time-frequency resource location of PRACH transmission within a system frame (10 ms), so the duration range that RA-RNTI may represent is 10 ms. When the subsequent protocol enhances the duration of the RA-RNTI to 2, 3 or more system frames, the duration that the RA-RNTI represents may be correspondingly increased to longer, such as 20 ms and 30 ms.

With regard to the DRX retransmission timer, when the uplink DRX retransmission timer (drx-RetransmissionTimerUL) timeouts, the UE launches the extended window only if the UE does not receive the indication of having obtained channel from the base station within the operation duration of the DRX retransmission timer, the UE still does not receive the ACK feedback of the uplink transmission, and the uplink transmission is the uplink transmission corresponding to the configured grant.

At step 405, it is determined whether the target downlink signal or the indication of having obtained channel sent by the access network device is received within the extended window.

When the target downlink signal is received, step 403 is executed.

When the indication of having obtained channel is received, but the target downlink signal is not received, step 406 is executed.

When neither the indication of having obtained channel nor the target downlink signal is received, step 408 is executed.

At step 406, the second window is launched.

When the terminal receives the indication of having obtained channel sent by the access network device at a time point A of the expanded window, the terminal launches the second window at the time point A and continues to wait for receiving the target downlink signal within the second window.

Figure 17:
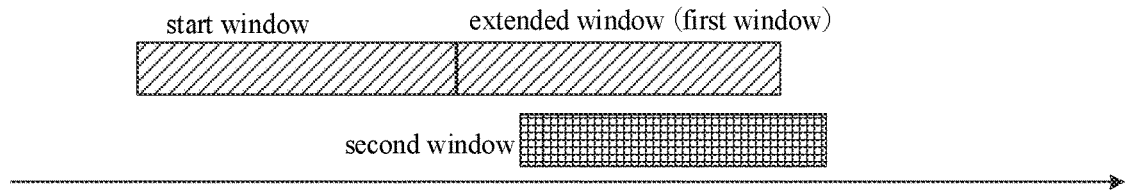
FIG. 17 is a schematic diagram illustrating a relationship between windows of a target downlink signal according to an exemplary embodiment of the disclosure.

With reference to FIG. 17, the second window is a window launched outside the extended window. In an alternative embodiment, the extended window is closed when the second window is launched.

At step 407, it is determined whether the terminal receives the target downlink signal within the second window.

When the target downlink signal is received, the above step 403 is executed.

When the terminal determines that the target downlink signal is not received, step 408 is executed.

At step 408, the terminal initiates connection reestablishment, reports RLF or initiates a random access procedure.

In the data transmission scenario, when the terminal never receives the target downlink signal, it is considered that the link may fail, so a new connection is re-established.

For the random access procedure, when the terminal never receives the target downlink signal, the terminal re-initiates a random access request.

It should be noted that, at step 402, when the terminal does not receive the target downlink signal within the first window, but receives the indication of having obtained channel sent by the access network device, the terminal skips the step of launching the extended window and directly launches the second window to wait for receiving the target downlink signal.

In conclusion, with the method provided in this embodiment, a new extended window is launched after the end of the start window to continue to receive the target downlink signal or the indication of having obtained channel sent by the access network device, such that a receiving window of the terminal is prolonged and the problem of missing the target downlink signal due to a small first window is avoided.

In the alternative embodiment based on FIG. 17, the start window is an uplink DRX retransmission timer. The above method further includes: waiting for receiving the target downlink signal in the uplink DRX retransmission timer by the terminal; launching the extended window when the terminal does not receive the target downlink signal, the indication of having obtained channel and the ACK feedback of uplink transmission in the uplink DRX retransmission timer. The uplink transmission is the uplink transmission corresponding to the configured grant.

In an alternative embodiment based on FIG. 17, the above method further includes: after the end of the extended window, starting or re-restarting an uplink short DRX cycle timer by the terminal to enter a short DRX cycle when the terminal does not receive the indication of having obtained channel within the extended window; or starting or re-starting the uplink short DRX cycle timer by the terminal to enter the short DRX cycle when the extended window is launched.

Based on the alternative embodiments of the above embodiments, the method further includes:

at the end of the first window, initiating connection reestablishment, reporting a radio link failure (RLF), or re-initiating a random access procedure by the terminal; or stopping the random access procedure by the terminal when the first window ends and the first window is a random access response window; or waiting for receiving the target downlink signal within the second window when the first window ends and the second window does not end; and initiating the connection reestablishment, reporting the RLF or re-initiating the random access procedure by the terminal when the target downlink signal is not received within the second window.

In another alternative embodiment, for a scenario of the DRX retransmission timer, the disclosure also provides following embodiments.

Figure 18:
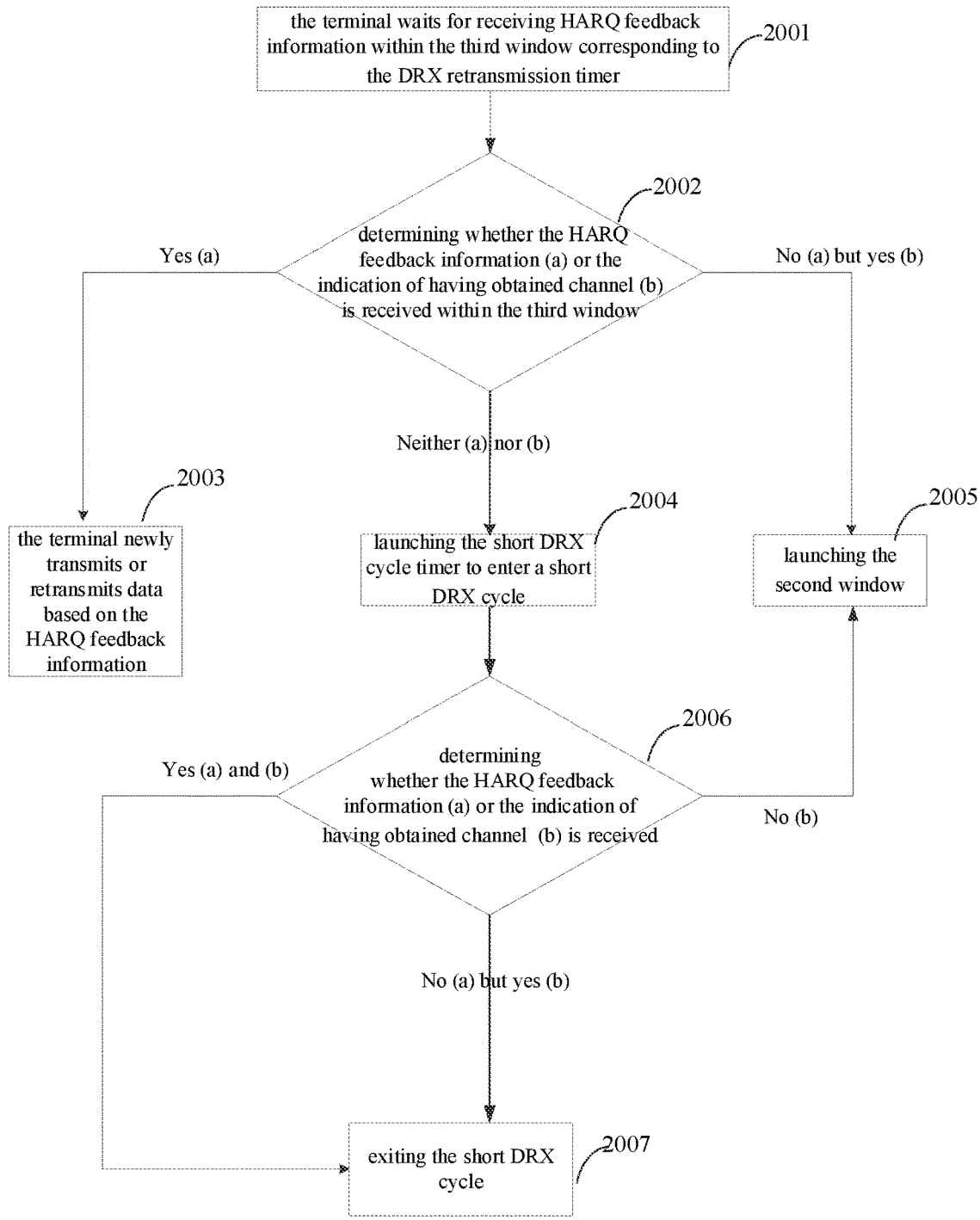
FIG. 18 is a flow chart illustrating a method for receiving a target downlink signal according to an exemplary embodiment of the disclosure.

FIG. 18 is a flow chart illustrating a method for receiving a target downlink signal according to an exemplary embodiment of the disclosure. The method may be executed by the terminal in FIG. 1. The method includes the following.

At step 2001, the terminal waits for receiving HARQ feedback information within a third window corresponding to the DRX retransmission timer.

The terminal starts the DRX retransmission timer after sending uplink data to the access network device. Each DRX retransmission timer corresponds to its own HARQ process. Alternatively, there are multiple HARQ processes in parallel, such as up to 8.

The DRX retransmission timers corresponding to respective HARQ processes are independent of each other.

Alternatively, the HARQ feedback information includes an ACK or NACK.

At step 2002, it is determined whether the HARQ feedback information or the indication of having obtained channel is received within the third window.

Step 2003 is executed when the HARQ feedback information is received within the third window.

When the HARQ feedback information is not received within the third window, but the indication of having obtained channel sent by the access network device is received, step 2005 is executed. When neither the HARQ feedback information nor the indication of having obtained channel sent by the access network device is received within the third window, step 2004 is executed.

At step 2003, the terminal newly transmits or retransmits data based on the HARQ feedback information.

Upon receiving the ACK, the terminal newly transmits a following piece of uplink data. Upon receiving the NACK, the terminal retransmit a latest piece of uplink data.

At step 2004, the short DRX cycle timer is launched to enter a short DRX cycle.

The short DRX cycle timer is launched to enter the short DRX cycle when neither the HARQ feedback information nor the indication of having obtained channel sent by the access network device is received within the third window.

A conventional short DRX cycle timer (drx-ShortCycleTimer) is used as the short DRX cycle timer, or a new short DRX cycle timer specifically for the DRX retransmission is used.

When the new short DRX cycle timer specifically for the DRX retransmission is used, the conventional short DRX cycle timer is not restarted when entering the short DRX cycle for DRX retransmission.

At step 2005, the second window is launched.

When the HARQ feedback information is not received within the third window, but the indication of having obtained channel is received, the second window is launched to wait for receiving the HARQ feedback information. The description for the second window may refer to the above embodiments, which is not repeated.

After step 2004, the method further includes steps 2006 and 2007.

At step 2006, it is determined whether the HARQ feedback information or an indication of having obtained channel is received during a DRX on duration of the short DRX cycle.

In an alternative embodiment, when the UE does not receive the indication of having obtained channel from the base station during the DRX on duration of the short DRX cycle for the DRX retransmission, the UE starts or restarts the short DRX cycle timer to re-enter the short DRX cycle of the DRX retransmission.

In an alternative embodiment, when the UE receives the indication of having obtained channel from the base station, but does not receive the PDCCH scheduling, during the DRX on duration of the short DRX cycle of the DRX retransmission, the UE exits the short DRX cycle of the DRX retransmission.

In an alternative embodiment, when the UE receives the indication of having obtained channel from the base station and receives the HARQ process corresponding to the PDCCH scheduling of the DRX retransmission, during the DRX on duration of the short DRX cycle of the DRX retransmission, the UE exits the short DRX cycle of the DRX retransmission.

Upon the HARQ feedback information or the indication of having obtained channel sent by the access network device is received, step 2007 is executed.

At step 2007, the short DRX cycle is exited.

When the indication of having obtained channel sent by the access network device is not received, the above step 2005 is executed.

It should be noted that, each DRX retransmission timer timeout may trigger a short DRX cycle of the DRX retransmission, so there is a situation that short DRX cycles of multiple DRX retransmission triggered by multiple DRX retransmission timers operate in parallel. Exiting the short DRX cycle of one DRX retransmission does not affect the short DRX cycles of other DRX retransmissions. If all short DRX cycles of the DRX retransmissions exit, but the conventional short DRX cycle timer is not timed out, the UE is still in the conventional short DRX cycle, otherwise, the UE is in the long DRX cycle.

The following is apparatus embodiments of the disclosure, which may be configured to execute the method embodiments of the disclosure. For details not disclosed in apparatus embodiments of the disclosure, please refer to method embodiments of the disclosure.

Figure 19:
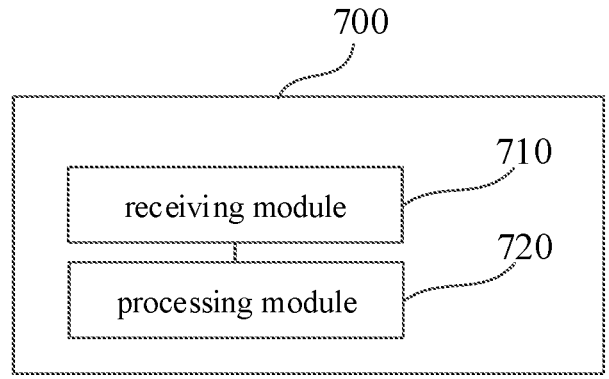
FIG. 19 is a block diagram illustrating an apparatus for receiving a target downlink signal according to an exemplary embodiment of the disclosure.

FIG. 19 is a block diagram illustrating an apparatus for receiving a target downlink signal according to an exemplary embodiment of the disclosure. The apparatus has the exemplary functions of implementing the above method for receiving a signal, and may be implemented by hardware or by hardware executing corresponding software. The apparatus 700 may include: a receiving module 710, and a processing module 720.

The receiving module 710 is configured to wait for receiving a target downlink signal within a first window. The processing module 720, configured to launch a second window when the terminal receives an indication of having obtained channel sent by an access network device within the first window. The receiving module 710 is configured to wait for receiving the target downlink signal within the second window.

Alternatively, the indication of having obtained channel includes at least one of following information: DRS; CSI-RS; SSB; and PDCCH scheduling information.

Alternatively, the receiving module 710 is configured to:
wait for receiving first PDCCH scheduling information within a DRX on duration;
or,
wait for receiving a second PDCCH scheduling information within a DRX inactivity timer;
or,
wait for receiving first scheduling information during an operation of a DRX retransmission timer, in which the first scheduling information is retransmission scheduling information or new transmission scheduling information of a hybrid automatic repeat request (HARQ) process corresponding to the DRX retransmission timer;
or,
wait for receiving a random access response (RAR) within a random access response window;
or,
wait for receiving a contention resolution message within a random access contention resolution window;
or,
wait for receiving second scheduling information within a duration of a configured grant timer, wherein the second scheduling information is retransmission scheduling information or new transmission scheduling information of a HARQ process corresponding to the configured grant timer;
or,
wait for receiving HARQ feedback information within the duration of the configured grant timer, wherein the HARQ feedback information is feedback information corresponding to the configured grant timer.

Alternatively, the processing module 720 is configured to: stop receiving the target downlink signal when the target downlink signal is not received within the second window; and/or, stop receiving the target downlink signal when the target downlink signal is not received within the first window.

Alternatively, the processing module 720 is configured to:
when first PDCCH scheduling information is not received within a DRX on duration, stop receiving the first PDCCH scheduling information, and enter a DRX off state;
or,
when second PDCCH scheduling information is not received within a DRX inactivity timer, stop receiving the second PDCCH scheduling information, and enter the DRX off state;
or,
when first scheduling information is not received during an operation of a DRX retransmission timer, stop receiving the first scheduling information, and determine scheduling information of a HARQ process corresponding to the DRX retransmission timer as new transmission scheduling information or retransmission scheduling information;
or,
when RAR is not received within a random access response window, stop receiving the RAR, and retransmit a random access preamble;
or,
when a contention resolution message is not received within a random access contention resolution window, stop receiving the contention resolution message, and retransmit the random access preamble;
or,
when second scheduling information is not received within a configured grant timer, stop receiving the second scheduling information, and confirm that the access network device has received new transmission scheduling or retransmission scheduling;
or,
when HARQ feedback information is not received within the configured grant timer, stop receiving the HARQ feedback information, and determine that ACK/NACK information is received.

Alternatively, the processing module 720 is configured to stop receiving the target downlink signal when the target downlink signal is received within the second window.

Alternatively, the processing module 720 is configured to:

initiate connection reestablishment, report a radio link failure (RLF), or re-initiate a random access procedure when the first window ends;

or, stop a current random access procedure when the first window ends and the first window is a random access response window;

or, wait for receiving the target downlink signal within the second window when the first window ends and the second window does not end; and initiate the connection reestablishment, report the RLF or re-initiate the random access procedure when the target downlink signal is not received within the second window.

Alternatively, the processing module 720 is configured to stop the random access procedure by the terminal when the target downlink signal and the indication of having obtained channel are not received within the first window.

Alternatively, the processing module 720 is configured to launch the second window and close the first window at a moment of receiving the indication of having obtained channel.

Alternatively, a duration of the first window is preconfigured by the access network device, or the duration of the first window is predefined; and/or a duration of the second window is preconfigured by the access network device, or the duration of the second window is predefined.

Alternatively, the first window is the DRX retransmission timer. The duration of the first window and/or the duration of the second window is a common duration, and the common duration is a duration shared by at least two logical channels; or, the duration of the first window corresponding to at least two logical channels are different, and/or the duration of the second window corresponding to at least two logical channels are different; or, the duration of the first window corresponding to the uplink transmission and the downlink transmission are different, and/or the duration of the second window corresponding to the uplink transmission and the downlink transmission are different.

Alternatively, the first window is an extended window launched after a start window ends; and the extended window is configured to wait for receiving the target downlink signal after the start window.

Alternatively, the duration of the second window is the same as that of the start window; or a ratio of the duration of the second window to the duration of the start window conforms to a preset ratio.

Alternatively, the processing module 720 is configured to initiate the connection reestablishment or report the RLF when the target downlink signal and the indication of having obtained channel are not received within the extended window.

Alternatively, the start window is a random access response window. A duration of the extended window is equal to a first difference, and the first difference is obtained by subtracting a preconfigured window size of a RAR from a duration represented by a random access wireless network temporary identifier (RA-RNTI).

Alternatively, the start window is an uplink DRX retransmission timer.

The receiving module 710 is configured to wait for receiving the target downlink signal within the uplink DRX retransmission timer. The processing module 720 is configured to launch the extended window when the terminal does not receive the target downlink signal, the indication of having obtained channel and an ACK feedback of the uplink transmission within the uplink DRX retransmission timer. The uplink transmission is an uplink transmission corresponding to configured grant.

Alternatively, the processing module 720 is configured to: after the end of the extended window, start or re-start an uplink short DRX cycle timer to enter a short DRX cycle when the terminal does not receive the indication of having obtained channel within the extended window; or, start or re-start the uplink short DRX cycle timer to enter the short DRX cycle when the extended window is launched.

Alternatively, the processing module 720 is configured to stop monitoring the target downlink signal when the target downlink signal is received within the second window.

Alternatively, the receiving module 710 is configured to: receive the first RAR within the first window or the second window; and determine that a RAR corresponding to the terminal is received when a first RA-RNTI for scheduling the first RAR is consistent with a second RA-RNTI of a time-frequency resource used by the terminal for sending a random access preamble, and a random access preamble identifier (RAPID) within the first RAR corresponds to a random access preamble selected by the terminal.

Alternatively, the receiving module 710 is configured to: receive a second RAR of all RA-RNTIs within the first window or the second window; and determine that a RAR corresponding to the terminal is received when a RAPID within the second RAR corresponds to a random access preamble selected by the terminal.

Alternatively, the receiving module 710 is configured to: receive a third RAR scheduled by a designated RA-RNTI within the first window or the second window; determine that a RAR corresponding to the terminal is received when a RAPID within the third RAR corresponds to a random access preamble selected by the terminal.

In a possible embodiment, there is provided another apparatus 800 for receiving a target downlink signal. The apparatus includes: a receiving module 810 and a processing module 820.

The receiving module 810 is configured to wait for receiving a HARQ feedback information within a third window corresponding to a DRX retransmission timer. The processing module 820 is configured to launch a short DRX cycle timer to enter a short DRX cycle when the HARQ feedback information and an indication of having obtained channel are not received within the third window.

Alternatively, the short DRX cycle timer is a conventional short DRX cycle timer, or a timer newly launched outside the conventional short DRX cycle timer.

Alternatively, the receiving module 810 is configured to receive a configuration parameter of the short DRX cycle by the terminal. The configuration parameter includes an on duration value of the short DRX cycle and a cycle value of the short DRX cycle.

Alternatively, the configuration parameter of the short DRX cycle is a common duration, and the common duration is a value shared by at least two logical channels; or, the configuration parameter of the short DRX cycle corresponding to at least two logical channels are different; or, the configuration parameter of the short DRX cycle corresponding to uplink transmission and downlink transmission are different.

Alternatively, the processing module 820 is configured to re-start the short DRX cycle timer to re-enter the short DRX cycle when the terminal does not receive the indication of having obtained channel within an on duration of the short DRX cycle.

Alternatively, the processing module 820 is configured to exit the short DRX cycle when the terminal receives the indication of having obtained channel and does not receive the HARQ feedback information within the on duration of the short DRX cycle.

Alternatively, the processing module 820 is configured to exit the short DRX cycle when the terminal receives the indication of having obtained channel and the HARQ feedback information within the on duration of the short DRX cycle.

According to another aspect of embodiments of the disclosure, there is provided a communication system. The communication system includes: a terminal and an access network device. The terminal is the apparatus for receiving a target downlink signal according to the above embodiments of the disclosure.

According to another aspect of embodiments of the disclosure, there is provided a computer readable storage medium. The computer readable storage medium has at least one instruction, at least one program, a code set or an instruction set stored thereon. The at least one instruction, the at least one program, the code set or the instruction set is configured to be loaded and executed by a processor to implement the method for receiving a target downlink signal according to the above embodiments of the disclosure.

Figure 21:
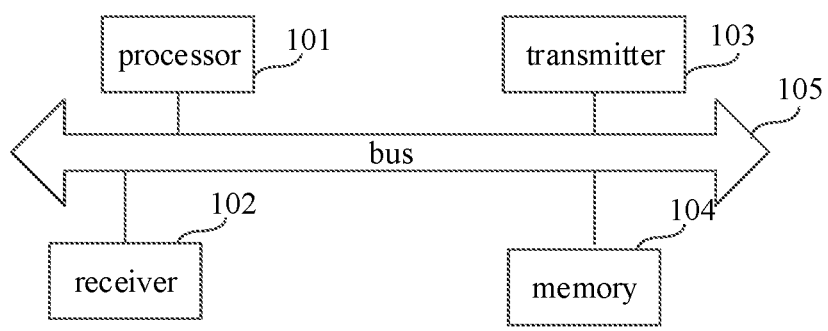
FIG. 21 is a block diagram illustrating a terminal according to an exemplary embodiment of the disclosure.

FIG. 21 is a block diagram illustrating a terminal according to an exemplary embodiment of the disclosure. The terminal includes a processor 101, a receiver 102, a transmitter 103, a memory 104 and a bus 105.

The processor 101 includes one or more processing cores, and is configured to execute various functional applications and information processing by running a software program and modules.

The receiver 102 and the transmitter 103 may be implemented as a communication component. The communication component may be a communication chip.

The memory 104 is connected to the processor 101 through the bus 105.

The memory 104 may be configured to store at least one instruction. The processor 101 is configured to execute the at least one instruction to implement respective steps in the above method embodiments.

In addition, the memory 104 may be implemented by any type of volatile or nonvolatile storage device or a combination thereof. The volatile or nonvolatile storage device includes, but is not limited to, a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM).

In an exemplary embodiment, there is also provided a non-transitory computer-readable storage medium including instructions, such as a memory including instructions. The instructions may be executed by a processor of the terminal to implement the above method. For example, the non-transitory computer-readable storage medium may be a ROM, a random access memory (RAM), a CD-ROM, a magnetic tape, a floppy disk and an optical data storage device.

A non-transitory computer-readable storage medium enables the terminal to execute the above method for receiving the downlink signal when the instructions in the non-transitory computer-readable storage medium are executed by the processor of the terminal.

Figure 22:
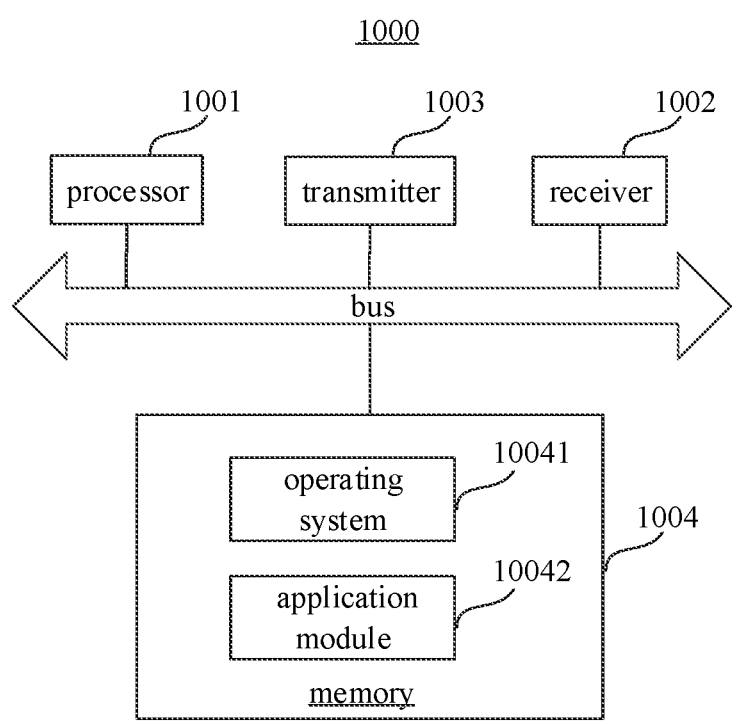
FIG. 22 is a block diagram illustrating an access network device according to an exemplary embodiment of the disclosure.

FIG. 22 is a block diagram illustrating an access network device 1000 according to an exemplary embodiment of the disclosure.

The access network device 1000 may include a processor 1001, a receiver 1002, a transmitter 1003 and a memory 1004. The receiver 1002, the transmitter 1003 and the memory 1004 are respectively connected with the processor 1001 through buses.

The processor 1001 includes one or more processing cores. The processor 1001 is configured to execute the method executed by the access network device in the transmission configuration method provided by embodiments of the disclosure by running the software program and modules. The memory 1004 may be configured to store the software programs and modules. In detail, the memory 1004 may store an operating system 10041 and an application module 10042 required by at least one function. The receiver 1002 is configured to receive communication data sent by other devices. The transmitter 1003 is configured to send communication data to other devices.

An exemplary embodiment of the disclosure also provides a system for receiving a target downlink signal (or called a communication system). The system for receiving the target downlink signal includes a terminal and an access network device.

The terminal is the apparatus for receiving the target downlink signal provided by the embodiment illustrated in FIG. 19.

Figure 20:
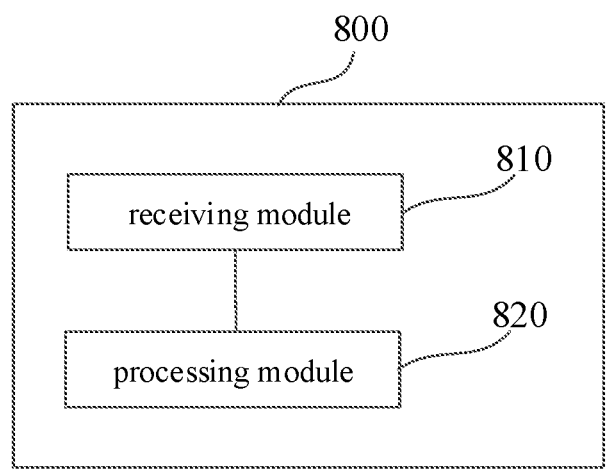
FIG. 20 is a block diagram illustrating an apparatus for receiving a target downlink signal according to another exemplary embodiment of the disclosure.

The access network device is the apparatus for receiving the target downlink signal provided by embodiments illustrated in FIG. 20.

An exemplary embodiment of the disclosure also provides a system for receiving a target downlink signal (or called a communication system). The system for receiving the target downlink signal includes a terminal and an access network device.

The terminal is a terminal provided in the embodiment illustrated in FIG. 21.

The access network device is an access network device provided in the embodiment illustrated in FIG. 22.

An exemplary embodiment of the disclosure also provides a computer-readable storage medium. The computer-readable storage medium has at least one instruction, at least one program, a code set or an instruction set stored thereon. The at least one instruction, the at least one program, the code set or the instruction set is configured to be loaded and executed by the processor to implement the action performed by the first terminal or the access network device in the method for receiving the target downlink signal according to the above method embodiments.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the claimed invention will only be limited by the appended claims.

What is claimed is:

1. A method for receiving a target downlink signal, applied to uplink transmission and downlink transmission using an unlicensed band, and comprising:

waiting by a terminal for receiving a target downlink signal within a first window;

launching a second window by the terminal when the terminal receives an indication of having obtained channel sent by an access network device within the first window, wherein the indication of having obtained channel is a signal other than physical downlink control channel (PDCCH) scheduling information, and the indication of having obtained channel indicates that the access network device successfully occupies the unlicensed band within the first window;

waiting by the terminal for receiving the target downlink signal within the second window; and when the first window ends, performing one of initiating connection reestablishment, reporting a radio link failure (RLF), or re-initiating a random access procedure by the terminal.

2. The method of claim 1, wherein the indication of having obtained channel comprises at least one of following information:
a dedicated reference signal (DRS);
a channel state information reference signal (CSI-RS);
a synchronization signal and PBCH block (SSB); and
a physical downlink control channel (PDCCH) indication.

3. The method of claim 1, wherein waiting by the first terminal for receiving the target downlink signal within the first window comprises:
waiting for receiving first PDCCH scheduling information within a DRX on duration;
or,
waiting for receiving second PDCCH scheduling information within a DRX inactivity timer;
or,
waiting for receiving first scheduling information during an operation of a DRX retransmission timer, in which the first scheduling information is retransmission scheduling information or new transmission scheduling information of a hybrid automatic repeat request (HARQ) process corresponding to the DRX retransmission timer;
or,
waiting for receiving a random access response (RAR) within a random access response window;
or,
waiting for receiving a contention resolution message within a random access contention resolution window;
or,
waiting for receiving second scheduling information within a duration of a configured grant timer, wherein the second scheduling information is retransmission scheduling information or new transmission scheduling information of a HARQ process corresponding to the configured grant timer;
or,
waiting for receiving HARQ feedback information within the duration of the configured grant timer, wherein the HARQ feedback information is feedback information corresponding to the configured grant timer.

4. The method of claim 1, further comprising:
stopping waiting for receiving the target downlink signal when the target downlink signal is not received within the second window;
and/or,
stopping waiting for receiving the target downlink signal when the target downlink signal is not received within the first window.

5. The method of claim 4, wherein stopping waiting for receiving the target downlink signal when the target downlink signal is not received within the second window comprises:
when first PDCCH scheduling information is not received within a DRX on duration, stopping receiving the first PDCCH scheduling information, and entering a DRX off state;
or,
when second PDCCH scheduling information is not received within a DRX inactivity timer, stopping receiving the second PDCCH scheduling information, and entering the DRX off state;
or,
when first scheduling information is not received during an operation of a DRX retransmission timer, stopping receiving the first scheduling information, and determining scheduling information of a HARQ process corresponding to the DRX retransmission timer as new transmission scheduling information or retransmission scheduling information;
or,
when RAR is not received within a random access response window, stopping receiving the RAR, and retransmitting a random access preamble;
or,
when a contention resolution message is not received within a random access contention resolution window, stopping receiving the contention resolution message, and retransmitting the random access preamble;
or,
when second scheduling information is not received within a configured grant timer, stopping receiving the second scheduling information, and confirming that the access network device has received new transmission scheduling or retransmission scheduling;
or,
when HARQ feedback information is not received within the configured grant timer, stopping receiving the HARQ feedback information, and determining that ACK/NACK information is received.

6. The method of claim 1, further comprising:
stopping a current random access procedure by the terminal when the first window ends and the first window is a random access response window;
or,
waiting for receiving the target downlink signal within the second window when the first window ends and the second window does not end; and initiating the connection reestablishment, reporting the RLF or re-initiating the random access procedure by the terminal when the target downlink signal is not received within the second window.

7. The method of claim 1, wherein the first window is a window corresponding to a random access response, and the method further comprises:
stopping a random access procedure by the terminal when the target downlink signal and the indication of having obtained channel are not received within the first window.

8. The method of claim 1, wherein launching the second window comprises:
launching the second window and closing the first window at a moment of receiving the indication of having obtained channel.

9. The method of claim 1, wherein a duration of the first window is preconfigured by the access network device, or the duration of the first window is predefined;
and/or,
a duration of the second window is preconfigured by the access network device, or the duration of the second window is predefined.

10. The method of claim 9, wherein the first window is a DRX retransmission timer;
the duration of the first window and/or the duration of the second window is a common duration, and the common duration is a duration shared by at least two logical channels;
or,
the duration of the first window corresponding to at least two logical channels are different, and/or the duration of the second window corresponding to at least two logical channels are different;
or,
the duration of the first window corresponding to uplink transmission and downlink transmission are different, and/or the duration of the second window corresponding to uplink transmission and downlink transmission are different.

11. The method of claim 1, wherein the first window is an extended window launched after a start window ends; and
the extended window is configured to continue to wait for receiving the target downlink signal after the start window.

12. The method of claim 1, further comprising:
stopping monitoring the target downlink signal when the target downlink signal is received within the second window.

13. The method of claim 1, wherein the first window is a random access response window, the random access response is response information in a non-competitive random access procedure not triggered by a beam failure recovery, and the method further comprises:
receiving a first RAR within the first window or the second window; and
determining that a RAR corresponding to the terminal is received when a first RA-RNTI for scheduling the first RAR is consistent with a second RA-RNTI of a time-frequency resource used by the terminal for sending a random access preamble, and a random access preamble identifier (RAPID) within the first RAR is corresponding to a random access preamble selected by the terminal.

14. The method of claim 1, wherein the first window is a window of a message 1 initiated by requesting a system message, and the method further comprises:
receiving a third RAR scheduled by a designated RA-RNTI within the first window or the second window; and
determining that a RAR corresponding to the terminal is received when a RAPID within the third RAR is corresponding to a random access preamble selected by the terminal.

15. A terminal, comprising:
a processor;
a transceiver, coupled to the processor; and
a memory, configured to store instructions executable by the processor,
wherein the processor is configured to load and execute the instructions to implement a method for receiving a target downlink signal, the method comprising:
waiting for receiving a target downlink signal within a first window;
launching a second window when the terminal receives an indication of having obtained channel sent by an access network device within the first window, wherein the indication of having obtained channel is a signal other than physical downlink control channel (PDCCH) scheduling information, and the indication of having obtained channel indicates that the access network device successfully occupies the unlicensed band within the first window;
waiting for receiving the target downlink signal within the second window; and
when the first window ends, performing one of initiating connection reestablishment, reporting a radio link failure (RLF), or re-initiating a random access procedure by the terminal.

* * * * *